CARTON CLAMPING AND GUIDING MEANS IN AN AUTOMATIC CARTON CLOSING MACHINE

Original Filed Dec. 20, 1965 9 Sheets-Sheet 1

45#/sq in
5#/sq in
Energized
De-energized
Vent
Stop Gate in "UP" Position
Stop Gate Retracted
Air Supply 45#/sq.in
5#/sq.in
Energized
De-energized
Vent
Stop Gate
Spring-biased "UP"
Retracted
AIR SUPPLY United States Patent Office Re. 26,650
Reissued Aug. 26, 1969

26,650

CARTON CLAMPING AND GUIDING MEANS IN AN AUTOMATIC CARTON CLOSING MACHINE

Winton Loveland, Freeport, and Saul Warshaw, New York, N.Y., assignors to The Loveshaw Corporation, Farmingdale, N.Y., a corporation of New York Original No. 3,382,645, dated May 14, 1968, Ser. No. 514,943, Dec. 20, 1965, which is a continuation-in-part of application Ser. No. 219,212, Aug. 24, 1962. Application for reissue July 5, 1968, Ser. No. 747,045
Int. Cl. B65b *57/02*; B65g *47/24*
U.S. Cl. 53—75 23 Claims

Matter enclosed in heavy brackets [ ] appears in the original patent but forms no part of this reissue specification; matter printed in italics indicates the additions made by reissue.

*ABSTRACT OF THE DISCLOSURE*

*The present invention pertains to automatic carton closing machines. This machine folds down and inward the upwardly-extending front and rear flaps of a series of successive open-top cartons of random size to closed lateral positions so as to be lapped by downwardly and inwardly folded side flaps for securing the folded flaps together in carton closing positions. Such automatic machine embodies a lateral conveyor mechanism having an entrance end and a discharge end and defining therebetween a path of forward advance of carton travel along which the conveyor mechanism moves the cartons successively in spaced apart relation. Along this path is located a flap folding and sensing station where each carton is caused to pause for folding inwardly by suitable mechanism the extending flaps. A pair of opposed, longitudinally-extending, carton clamping and guiding members are arranged along the carton travel path to receive each carton therebetween. Fluid driven mechanism moves this pair of members to opposite sides of each carton at the station to clamp it strongly therebetween for holding its securely during the flap folding operation and then eases off the clamping action to convert the pair of members to guides. Such pair of clamping members may carry elevating carton side engaging shoes which will be moved out of the way of the conveyor mechanism when the latter travels. The conveyor mechanism is driven by alternate low and high power driving means so that when each carton is clamped at the station the conveyor mechanism will not apply crushing force to the clamped carton and when the clamping action is converted to guiding action the released carton may be further advanced by the conveyor mechanism. Other features of the invention appear in the following specification and accompanying drawings.*

This application is a continuation-in-part of our application Ser. No. 219,212, filed Aug. 24, 1962, now Patent No. 3,236,022, for Automatic Carton Closing Machine.

The present invention relates to an automatic carton closing machine and, more particularly, to mechanisms therein for clamping each of a series of cartons fed therethrough successively in a temporarily stopped position at a flap folding station while flap folding operations are performed thereon and then guiding them through to the discharge end of the machine.

One aspect of this invention is particularly concerned with the problem of folding down the top flaps of cartons of relatively shallow depths, such as of the order of three to four and one-half inches (3"–4½") in height, in a machine that will efficiently perform such operations on cartons of random size which are higher than four and one-half inches (4½"). Such small cartons which have heights in this range frequently have rounded corners and are difficult to square between and to be clamped securely by opposed clamping members translated transversely relative to each other for this purpose.

In a machine of the construction of our copending application Ser. No. 219,212, filed Aug. 24, 1962, such carton clamping means are in the form of transversely spaced, elongated, parallel members or rails mounted for drive toward each other temporarily to clamp therebetween each carton when stopped at a carton sensing and flap folding station and then to release the closed carton for conveyor transport forward while the clamping rails serve as guides in such forward travel of the carton. The opposed inside faces of these clamping rails serve as the carton sides contacting means thereof and, in one form, are provided by upstanding edge flanges that flank opposite sides of the flap folding station and there clamp an intervening carton temporarily stopped at this station. The conveyor means which picks up each carton at the flap folding station and transports it forward after a flap folding operation is performed thereon preferably is of the chain conveyor type having transverse flight bars that travel above these rail inside flanges beneath the elevating head at the flap folding station which carries the mechanisms for folding the top flaps down to carton closing positions. When, as is proposed in that parent application, this flap folding head also carries beyond the flap folding station top taping mechanism, interference with the latter by the transverse flight bars of the chain conveyor must be avoided.

For this purpose and in connection with the development of one phase of the present invention the conveyor flight bars had to be lowered relative to the top edges of the opposed inside flanges of the clamping rails so that there was only about one-eighth of an inch (⅛") clearance and the height of these rail inside flanges required reduction to about one inch (1"). The resulting narrow carton clamping faces of these rail flanges increased the danger of crushing carton sides in the clamping action, and in the case of the small cartons having heights in the three to four and one-half inch (3"–4½") range effective clamping and properly aligned orientation was found to be unreliably attained due to the prevalence of the rounded corners and resulting tendency for such small cartons to be forced up or to jump over the opposed low rail side flanges.

It was further found in the development of the present invention that cartons of all sizes receivable by this closing machine, including the small ones of heights in the three to four and one-half inch (3"–4½") range, could be effectively centered in square orientation and securely clamped if the opposed clamping faces of the clamping and guiding members or the opposed rails thereof were provided in a form to attain an effective elevation at the time of clamping action of a minimum of about one and one-half inches (1½"). This led to the solution of the present invention.

These problems were solved by designing elevating and retractable carton side engaging means supported on at least one of the pair of opposed carton clamping and guiding members or rails at the inner side of the latter to constitute the means of contacting a side of a carton pausing at the flap folding station. In the event that one of these members or rails is embodied with a fixed mount in a position to extend outside of the interference zone, i.e., transversely beyond the path of the transverse flight bars, it may have an inner side clamping and guide face of the required minimum elevation in the form of a fixed face or flange structure. The opposed and cooperative clamping and guiding member or rail is mounted for transverse drive and retraction relative to this fixed one and is equipped with this carton side engaging means of unique form characterizing the present invention. Preferbly both of the clamping and guiding members or rails are mounted within the interference zone and are thus provided on their inner clamping sides with such carton side engaging means.

The present invention also provides means movably mounting each such carton side engaging means on the clamping and guiding member or rail supporting it for alternate elevation and retraction or motion away from the latter and the conveyor means toward the flap folding sub-assembly carried by the elevating head, for appreciable lap against the opposed carton side, and lowering such carton side engaging means toward the member or rail supporting it and the conveyor means to minimize projection thereof. This invention also provides means to effect such retraction as the conveyor means picks up the pausing carton at this station and transports it forward. The retraction of the extending carton side engaging means thus permits the free passage of each lowered flight bar of the conveyor means.

In association with such novel carton side engaging means there is also provided unique improvements in the mechanism for driving the opposed carton clamping and guiding members or rails toward each other to carton clamping positions and to reduce the clamping pressure against the carton sides sufficiently to permit each closed carton to be carried forward by the conveyor means with the opposed members or rails serving as effective guides. Such unique improvements simplifies the structure and mechanisms provided for this purpose in the identified parent application Ser. No. 219,212. The present invention also encompasses an improvement in the means for temporarily stopping each carton at the flap folding station and then releasing it for forward transport by the conveyor means to beneath the top tape applying mechanism in the event that the machine is equipped with such, this stopping means being separate from the conveyor means for separate operation thereof.

Another aspect of the present invention is concerned with a speed up of the rate of flap folding and carton closing operations effected by mechanisms of the machine to realize an appreciable increase in the rate of production performed by the machine. This is accomplished by so operating the periodically stopped chain conveyor section of the machine as to cause it to coast up to abutment of one of its transverse flight bars against the back end of each carton temporarily clamped in a stopped position at the flap folding station, so that when the carton is released thereafter for further transport forward it will be picked up almost instantaneously for the further transport.

In the event that any one of the group of cartons is delivered to the flap folding station ahead of the next oncoming flight bar of the chain conveyor and, in connection with this second aspect of the invention, the carton is stopped at this station by means separate from the chain conveyor there is no need to apply braking action to the chain conveyor. If in the temporary absence of such braking action the chain conveyor carries forward such following flight bar to abutment of the rear end of the carton stopped at the flap folding station the chain conveyor will be stopped by the pausing carton which is held by its separate stopping means. In accomplishing this action the drive of the chain conveyor must be reduced in force with ultimate slippage in order to avoid crushing the carton which, in accordance with the present invention, is accomplished in a unique manner.

This new development in the carton stopping and chain conveyor drive also takes into account in an effective manner the possibility that the next succeeding carton may not be delivered past the entrance gate at the time the chain conveyor advances its next oncoming flight bar toward such initially critical position of this next entering carton. In such case braking power is applied to the chain conveyor to hold it stopped until this succeeding carton is delivered forward past such initially critical position toward or to the flap folding station and the separate carton stopping means thereat.

Other objects of the invention will in part be obvious and will in part appear hereinafter, and the invention accordingly comprises the features of construction, combinations of elements, and arrangement of parts, which will be exemplified in the constructions hereinafter set forth.

For a fuller understanding of the nature and objects of the invention reference should be had to the following detailed description taken in connection with the accompanying drawings, in which.

Figure 1:
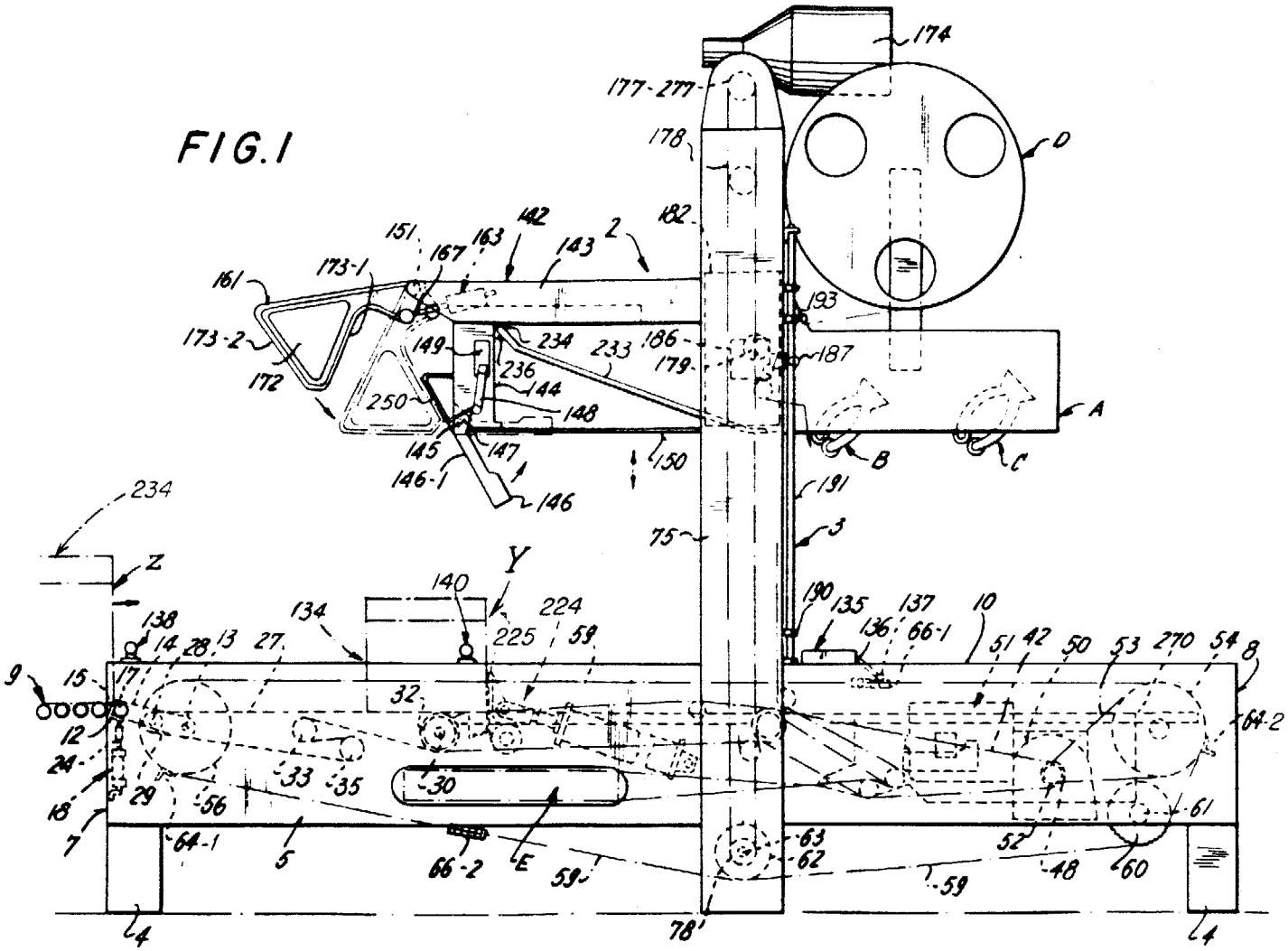
FIG. 1 is a side elevational view to reduce scale, with parts omitted for clarity, of a type of automatic carton closing machine which embodies forms of carton clamping and guiding means and also conveyor mechanism and carton stopping means of the present invention.
Figure 2:
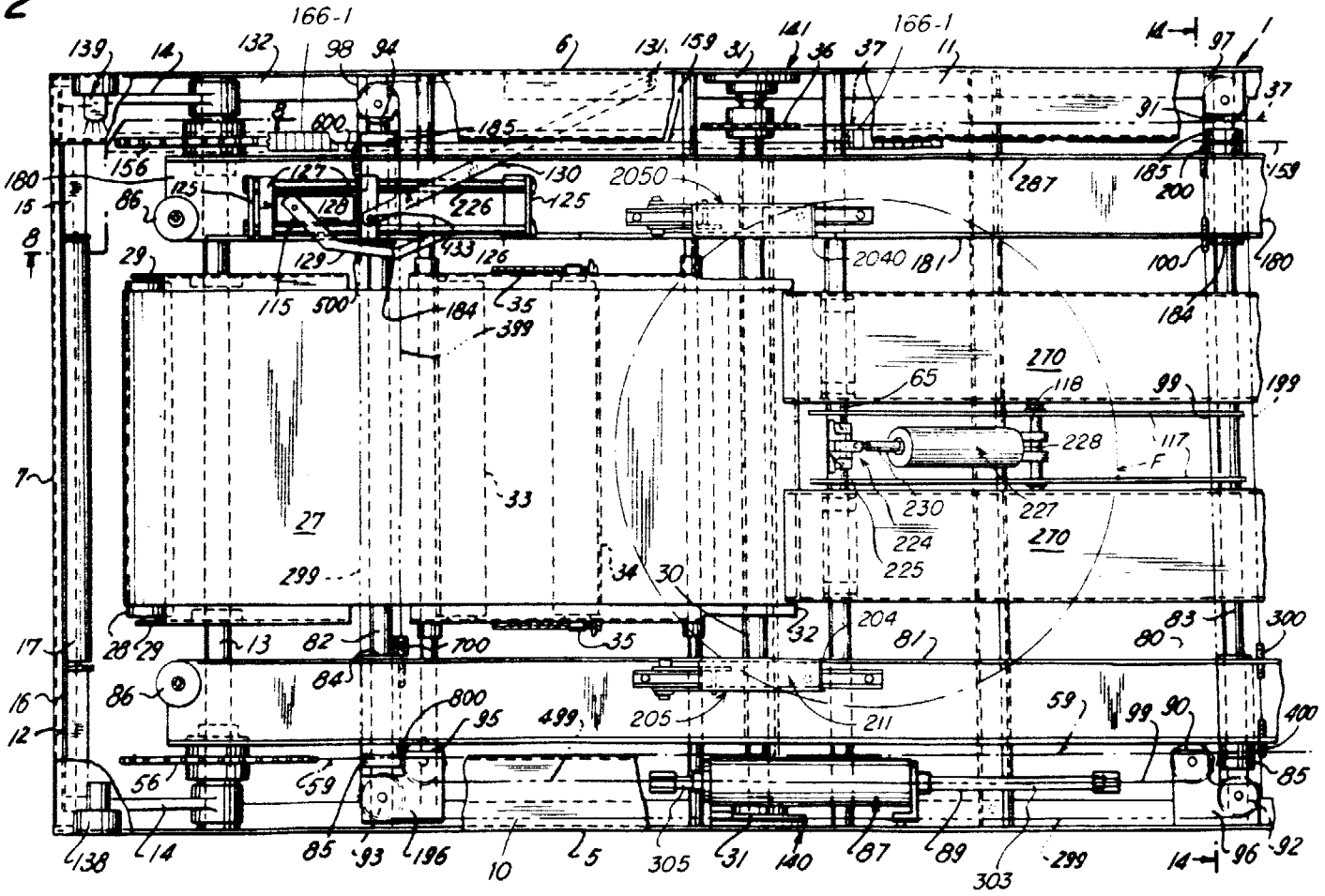
FIG. 2 is a top plan view to larger scale, with parts broken away, of the entrance end of the bed unit of the machine shown in FIG. 1, and illustrating features of the present carton clamping and guiding means and of the conveyor and stopping means.
Figure 3:
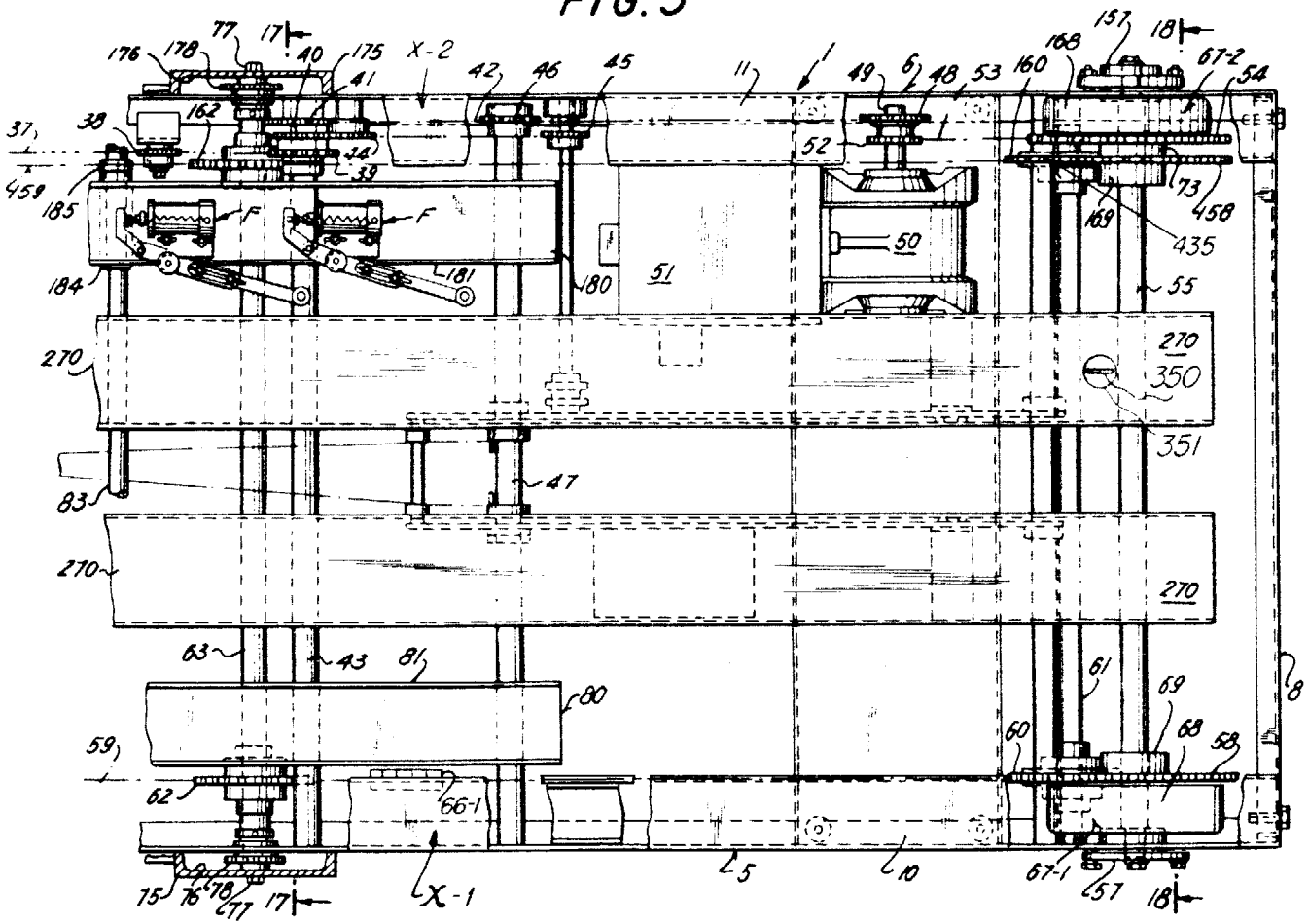
FIG. 3 is a view similar to FIG. 2, with parts in section, of the remaining discharge end of the bed of the machine.
Figures 9, 10, 11:
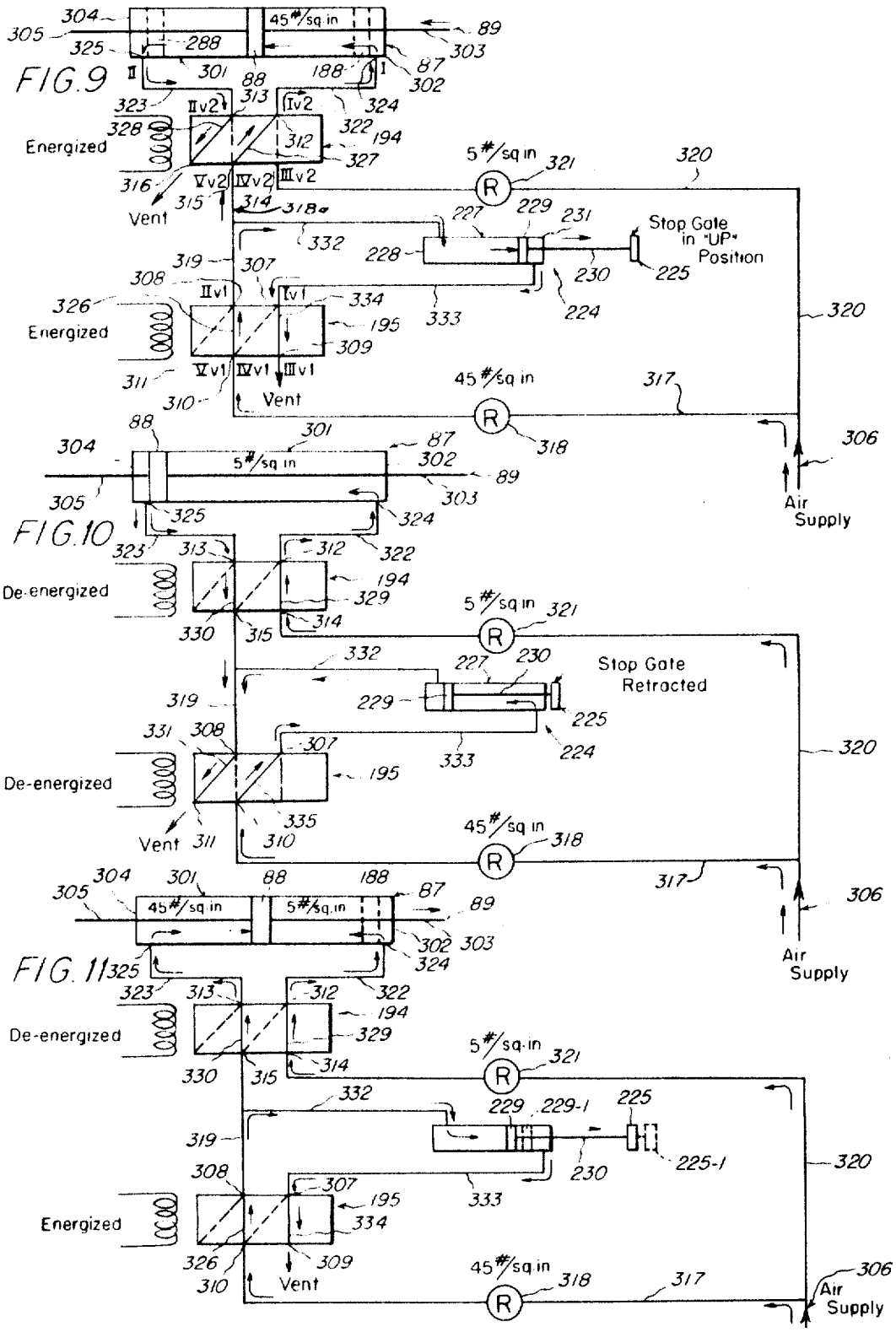
Figures 12, 13:
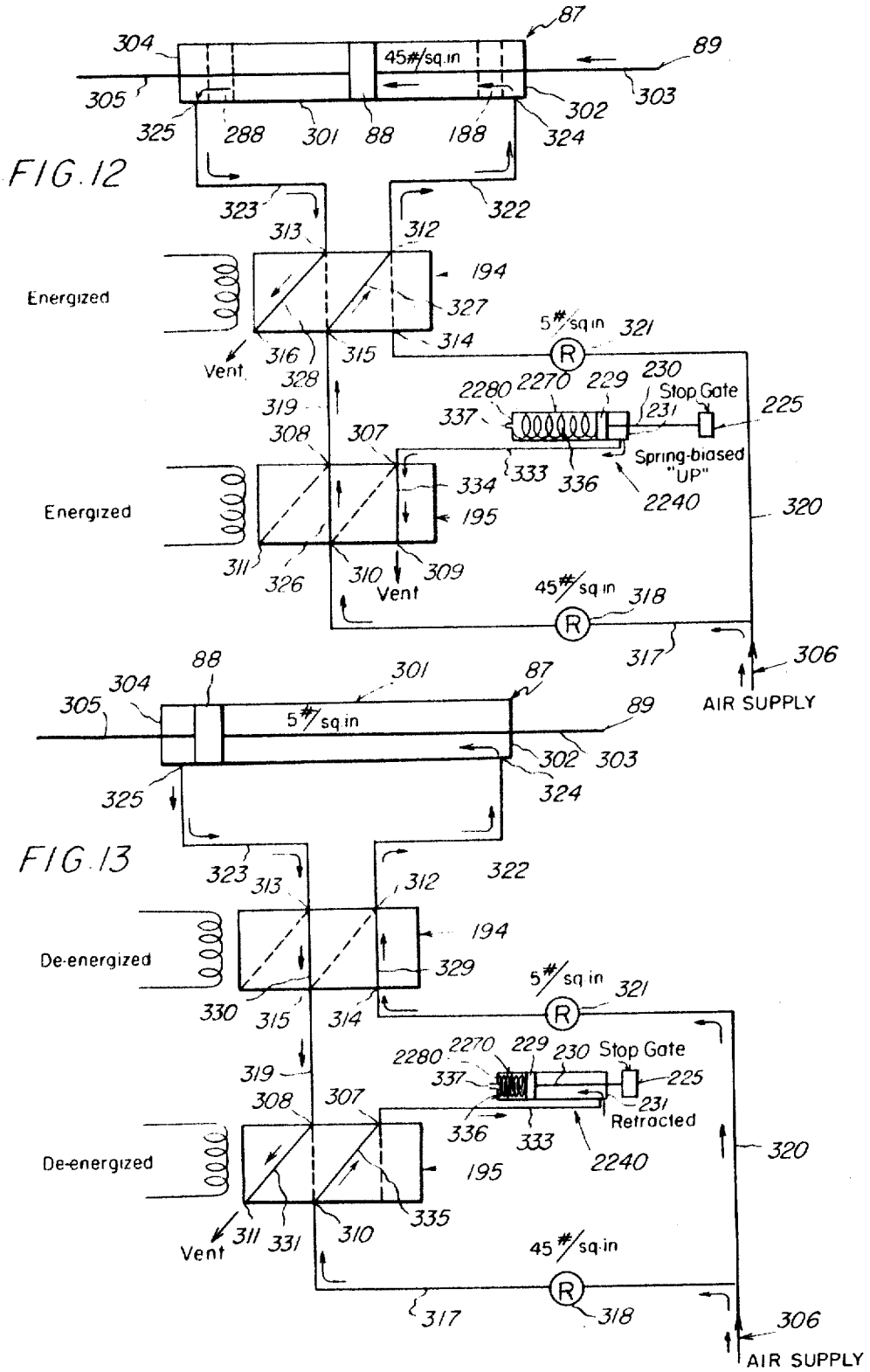
Figure 14:
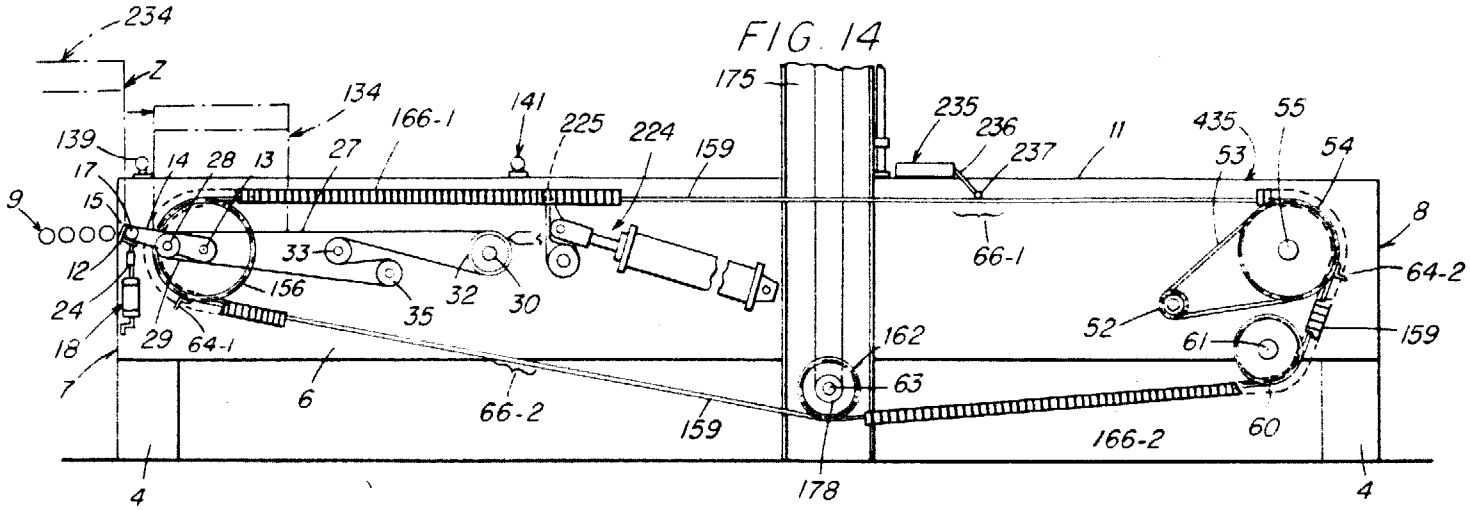
Figure 15:
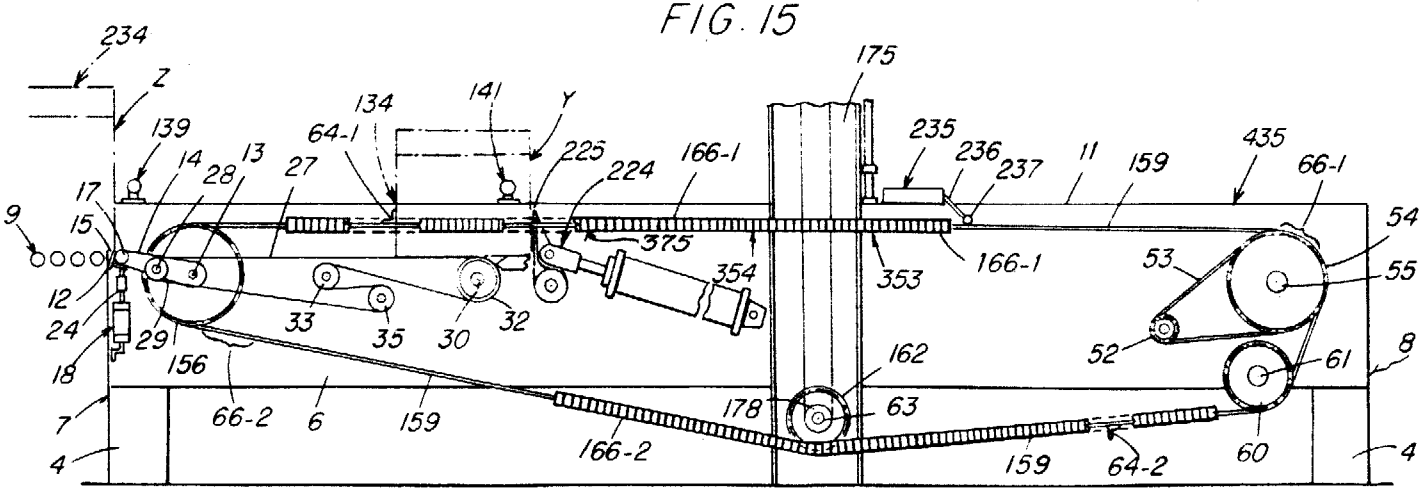
Figure 16:
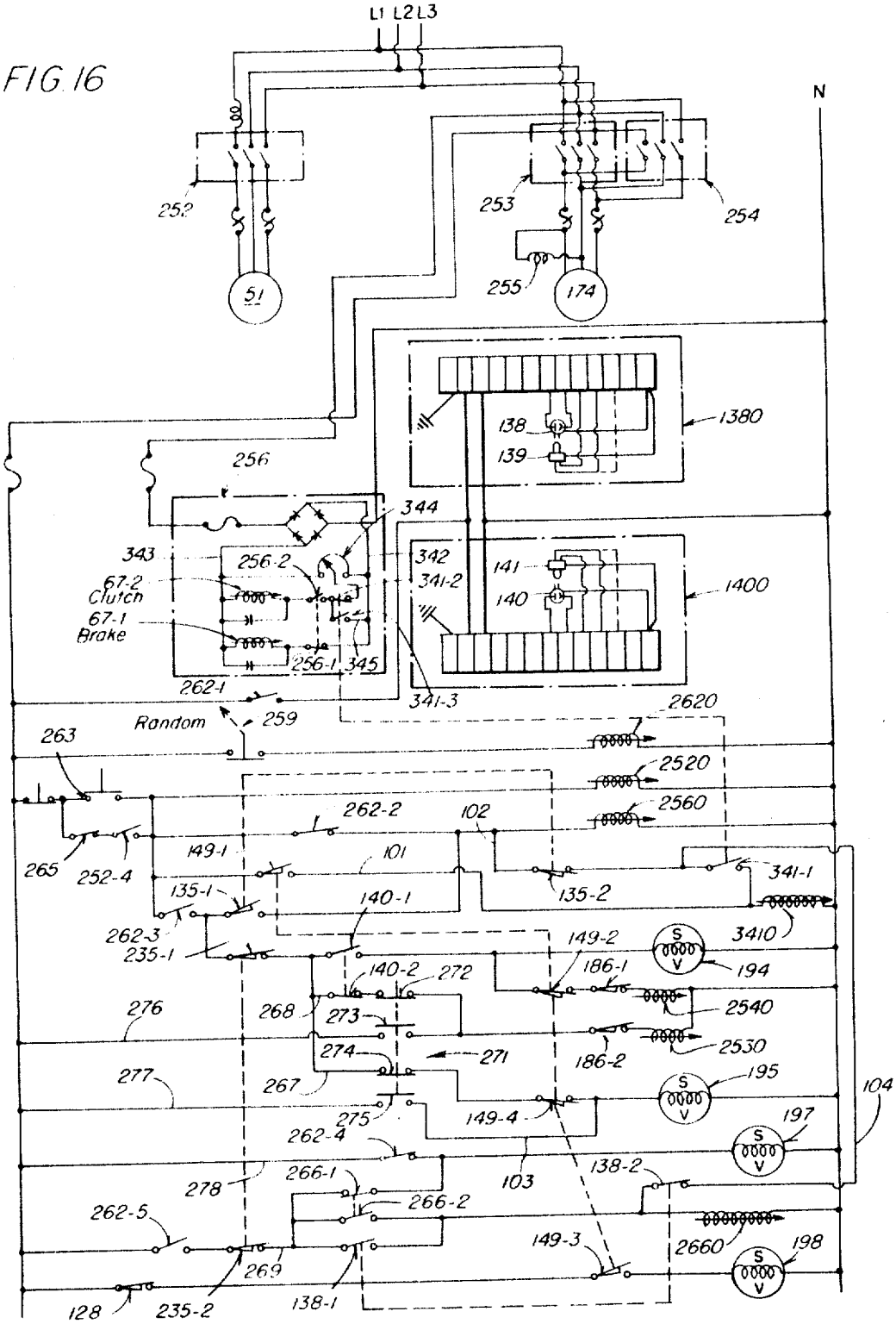
Figure 17:
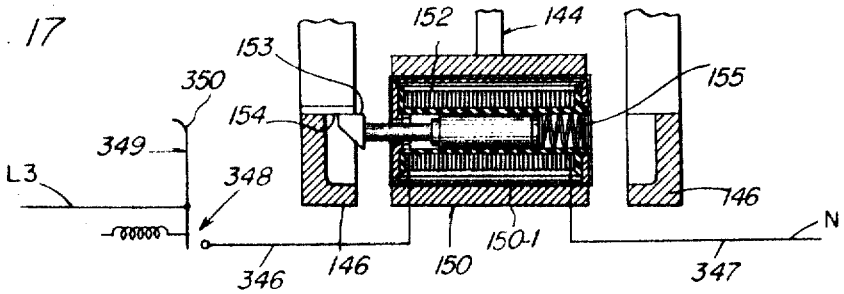
Figure 18:
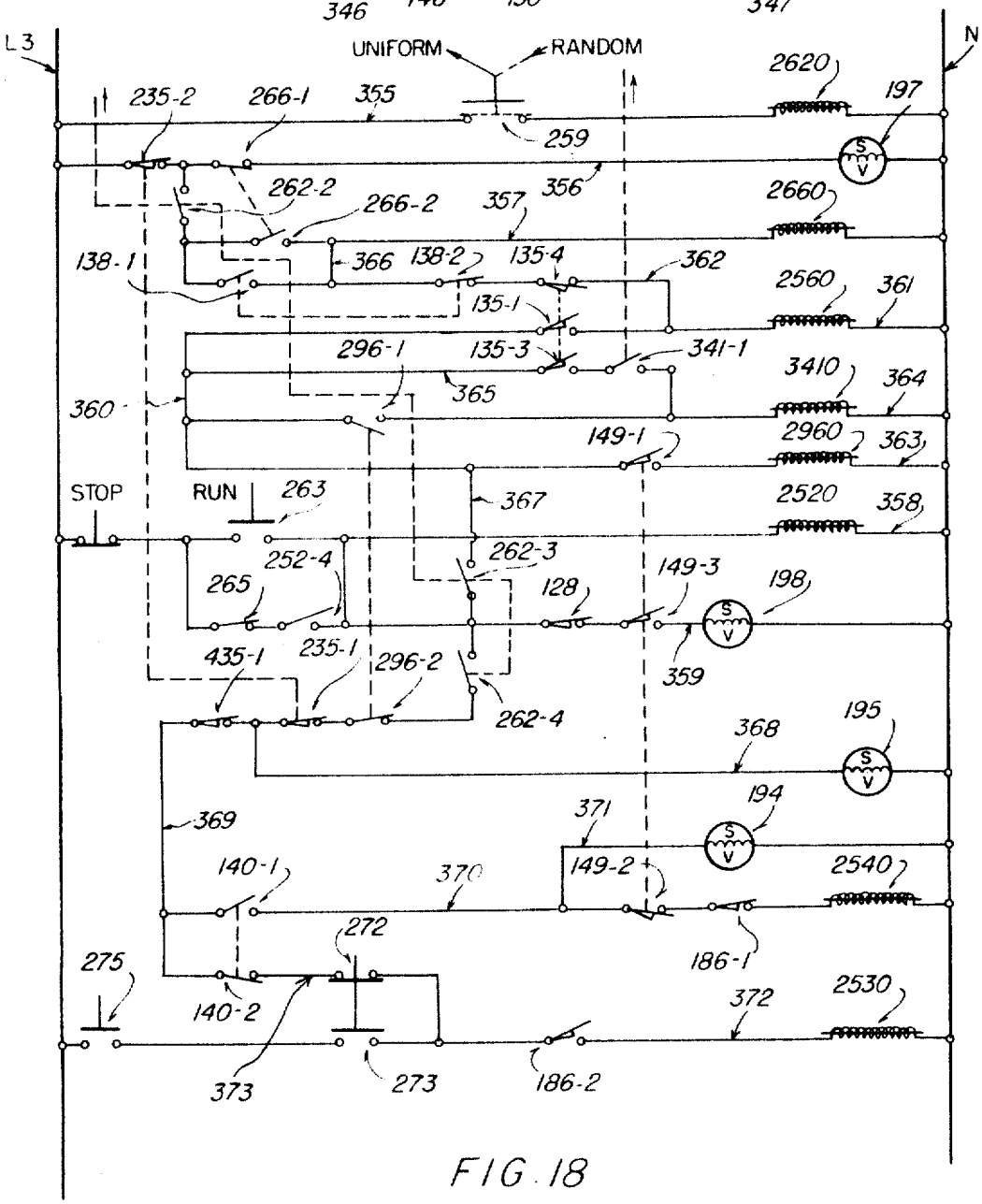

FIG. 9 is a diagrammatic view of pneumatic equipment primarily designed to operate or transversely drive toward each other and alternatively to retract the carton clamping and guiding members or rails, as well as secondarily pneumatic means associated therewith that may serve effectively to elevate and retract the carton stop gate at the flap folding station; the parts of such pneumatic system being shown in their relative positions to effect driving of the clamping and guiding rails in toward each other to opposite sides of a carton stopped at the flap folding station;

FIG. 10 is a diagrammatic view similar to FIG. 9, illustrating parts of the pneumatic system in their relative positions as a carton is clamped at the flap folding station between the opposed clamping and guiding members or rails;

FIG. 11 is a diagrammatic view similar to FIGS. 9 and 10, showing parts of the pneumatic system in relative positions to effect retraction of the carton clamping and guiding rails so as to spread them apart appreciably to initial positions for receiving therebetween a next succeeding carton as transported forward to the flap folding station;

FIG. 12 is a diagrammatic view similar to FIG. 9, but illustrating another type of mechanism for operating the carton stopping gate at the flap folding station;

FIG. 13 is a view similar to FIG. 10 of the pneumatic equipment shown in FIG. 12 under the FIG. 10 conditions;

FIG. 14 is a partially diagrammatic side elevational view, with parts broken away and omitted for clarity, of the machine shown in FIG. 1, with the near side thereof removed for observation of conveyor operated control mechanism located on the far side thereof, and showing the relationship of conveyor parts, carton entrance supply and feed means, carton stop means at the flap folding station and photocell controls with respect to a carton initially being fed thereto;

FIG. 15 is a view similar to FIG. 14 showing the advance position of parts of such mechanisms as the carton is delivered to the flap folding station and conveyor means advanced to a position assuring substantially instantaneous pick up thereby of a carton at the flap folding station after a flap folding operation has been performed at this station;

FIG. 16 is a schematic wiring diagram of the electrical circuitry of the machine depicted in FIGS. 1 to 3 incl. as well as solenoid valves illustrated in FIGS. 9 to 13 incl.;

FIG. 17 is a detail view, with parts in section and others schematic, of solenoid operated latch mechanism which may be associated with the front flap folding arm structure to hold this arm in its up, horizontal position for a time so as, during that period, to maintain the respective manipulated open and closed conditions of a gang of switches operated by the movement of this flap folding arm, and until a closed carton has advanced through the machine to a certain point; and FIG. 18 is a schematic wiring diagram of a portion of electrical circuitry of another [eembodiment] *embodiment* of the machine shown in FIGS. 1 to 3 incl. which employs variations of the electrical equipment proposed in FIG. 16 with respect to certain features and operational characteristics thereof.

Referring to the drawings, in which like numerals identify similar parts throughout, it will be seen, and particularly from FIGS. 1, 2 and 3, that the embodiment of the automatic carton closing machine illustrated by way of example therein may be similar to that of our above-identified patent application Ser. No. 219,212 and comprise a bed unit 1 and an elevating head unit 2 supported on the former by upwardly extending standards or columnar structure 3. [Conventially] *Conventionally* the parts of the machine are made of suitable [meals] *metals*, The bed unit 1 has a rectangular frame structure supported upon suitable legs 4. The frame structure may include opposed sidewalls 5 and 6, a relatively low end wall 7 at the entrance end, and another end wall 8 at the discharge end.

The bed unit 1 is equipped with lateral conveyor means suitably supported by the frame sidewalls 5 and 6, and this conveyor means has an entrance end in the vicinity of end wall 7 and a discharge end in the vicinity of [end] end wall 8. This conveyor means defines a longitudinal path of forward carton travel along which it successively transports a plurality of open-top cartons which may be of random sizes including those of relatively small heights, such as in the range of about three inches to four and one-half inches (3"–4½"). Such cartons are of conventional form being constructed, if desired, from corrugated board and rectangular in cross section with the edges of the top thereof provided with upwardly-extending front and back flaps respectively on the leading and trailing top edges and opposed upwardly-extending side flaps on the side top edges, all to be folded down to closed lateral lapping positions for securement in carton closing positions. The machine of the present invention is designed automatically to close successively the tops of such cartons in this manner after they have been loaded with the products to be marketed or shipped therein. Accordingly, any suitable feeding means, such as a roller conveyor 9, illustrated in FIG. 1, will be mounted adjacent the entrance end of the bed unit 1, i.e., adjacent the end wall 7, successively to feed a supply of the loaded cartons over the top edge of the latter to the conveyor means. The frame structure of the bed unit 1 may include lateral sheet metal ledges 10 and 11 extending inwardly from the top edges of the sidewalls 5 and 6 for support of certain control devices as will appear hereinafter, and strengthening cross framing members may be embodied.

At the entrance end of the bed unit 1, in the vicinity of end wall 7, is mounted a liftable gate 12 shown in FIGS. 1 and 2. A cross shaft 13, having its ends supported by sidewalls 5 and 6 of the frame structure, pivotally supports a pair of swinging arms 14 which carry on their back ends a gate bar 15. The gate bar 15 may be in the form of a length of angle stock having an upwardly-extending, carton-barring flange 16. The gate bar 15 preferably supports thereon a rotatable roll 17 over which the bottom of a loaded carton may advance readily after a leading portion advances thereover. It will be understood that when the gate arms 14 are swung upwardly, or in a clockwise direction as viewed in FIG. 1, the gate flange 16 will swing up above the plane defined by the tops of the series of feed rollers 9 to bar the leading end of a carton bottom supplied across the latter until this gate flange is lowered below this feed plane.

The conveyor means includes a continuously driven, initial endless section 27 indicated in FIG. 1 and seen in FIG. 2. For this purpose, an idling roller 28 may be rotatably supported by a pair of arms 29 pivotally mounted on the cross shaft 13, or, if desired, on a fixed position axis by suitable supporting means mounted to the machine frame. A driving shaft 30 is rotatably supported by bearing units 31 between the frame sidewalls 5 and 6, and carries fixed thereto a driving roller 32. The initial conveyor section 27 preferably is in the form of an endless belt lapped about the rollers 28 and 32. As will be best seen from FIG. 1, a bottom run of the conveyor belt 27 is lapped back and forth about idling rolls 33 and 34 with the latter supported by tension adjusting devices 35. The shaft 30 carries a sprocket 36 fixed thereto to be driven by a drive chain indicated by dot-dot-dot-dash lines 37 in FIGS. 2 and 3. The endless driving chain 37 has a run lapped against a guiding idler 38 and is lapped about a driving sprocket 39. Driving sprocket 39 is one of a group of three thereof fixed together with the second 40 constituting means for driving tape feeding mechanism and the third 41 constituting the driving sprocket about which is lapped a driving chain indicated by dot-dot-dash lines at 42 in FIG. 3. The group of sprockets 39, 40 and 41 are rotatably supported by a cross shaft 43 and the tape feed sprocket drives tape feeding mechanism comprising sprockets 44 and 45 about which an endless chain is lapped and a sprocket 46 against which the drive chain 42 is lapped in turn to drive a cross shaft 47 of tape feed mechanism. The endless chain 42 is lapped about a driving sprocket 48 fixed to a driving stub shaft 49 of a reduction gear unit 50 operated by a main driving electric motor 51. The driving stub shaft 49 also carries fixed thereto another driving sprocket 52 about which is lapped an endless driving chain indicated by dot-dash lines at 53 in FIG. 3, in turn lapped about a driven sprocket 54 rotatably supported by a cross shaft 55 equipped with suitable brake and clutch devices for drive of a second conveyor section as is explained hereinafter.

Cross shaft 13 also carries, rotatably supported thereon, a pair of near and far idler sprockets 56 and 156, as will be seen in FIG. 2, while cross shaft 55 is rotatably supported by bearing units 57 and 157 carried by frame sidewalls 5 and 6. As will be seen in FIG. 3, drive shaft 55 carries fixed thereto a pair of near and far sprockets 58 and 158 respectively aligned with sprockets 56 and 156. The second endless conveyor section preferably is in the form of a pair of endless chains, indicated by dot-dash lines 59 and 159 in FIGS. 2 and 3, respectively lapped about sprockets 56 and 58, and 156 and 158, for drive by sprockets 58 and 158. As will be best understood from FIG. 1, the lower run of each of the endless chains 59 and 159 is lapped beneath one of a pair of idlers 60 and 160 rotatably supported by a cross shaft 61 mounted between frame sidewalls 5 and 6, and beneath another of a pair of idlers 62 and 162 rotatably supported by another cross shaft 63. The second endless conveyor section also includes a series of carton transporting flight bars 64 which (as is indicated in FIG. 1, may be two in number spaced longitudinally appreciably apart. The pair of conveyor chains 59 and 159 also may carry a plurality of reversed flight bars which may be similar to the flight bars 64. There may be a pair of these reversed flight bars and each will constitute a carton stop having the function of holding a carton at a sensing and flap folding station when the second conveyor section pauses or is held in stop position. However, the illustrated embodiment of the machine preferably employs movable gate means at the exit end of this station to serve as such carton stop, and this mechanism is fully described hereinafter. The endless conveyor chain 59 on the near side, as viewed in FIG. 1, also is equipped with a pair of tripping lugs 66–1 and 66–2 to be carried along therewith for operating certain limit conveyor means, and in order to attain certain production speed-up of similar but longer tripping lugs 266–1 and 266–2 preferably are mounted on the companion conveyor chain 159 for a similar purpose as is demonstrated in FIGS. 14 and 15.

It will thus be seen that the initial conveyor section comprising endless belt 27 has an entrance end near the vicinity of the selector gate 12 and a discharge end at a point appreciably in advance thereof which is at a carton sensing and flap folding station. From the discharge end of the initial conveyor section or belt 27 suitable fixed carton-supporting structure extends forward, and this may be in the form of a pair of fixed flat plates or rails 270 suitably supported between the frame sidewalls 5 and 6, such as by fixed cross rod 65 beneath their front ends (see FIG. 2) and other similar support means. Carton support plates or rails 270 terminate in the vicinity of the discharge end wall 8, as will be seen from FIG. 3. The second conveyor section comprising conveyor chains 59 and 159 and their flights 64 extend forward at least from the discharge end of the belt conveyor 27 to the discharge end of the bed unit 1. As will be apparent from FIG. 2, preferably the entrance end of the chain conveyor appreciably laps the discharge end of the belt conveyor and, in fact, has its chain-supporting front sprockets 56 and 156 rotatably supported on the same cross shaft 13 which pivotally carries the arms 29 rotatably supporting roller 28 about which the entrance end of the conveyor belt 27 is lapped. Thus, any carton which is delivered to the sensing and flap folding station by the conveyor belt 27 will be picked up there by an oncoming flight 64 of the chain conveyor to be slid forward over the rails 270 to the discharge end of the bed unit 1.

The near end of driven cross shaft 55 carries a housed magnetic brake 67–1 and the far end thereof carries a housed magnetic clutch 67–2, both of which are indicated in FIG. 3, and these units may be of conventional construction. For example, the frame sidewall 5 may fixedly support through fixed housing 68 of the brake unit 67–1 fixed field coils and core structure thereof opposed to an axially slidable armature therein. Hub 69 of drive sprocket 58 is keyed to the drive shaft 55 and the sprocket in turn carries circumferentially-spaced, axially-extending pins on which is slidably mounted for axial motion the armature, which may be in the form of a paramagnetic disc (hidden in housing 68). The fixed core structure is annular and has a friction face equipped with suitable brake lining material opposed to a face of the slidable armature plate, so that when the brake field coil is energized the armature plate is drawn axially against the brake lining of the fixed magnetic core structure to clamp it thereto and prevent the driven cross shaft 55 from rotating. The clutch unit 67–2 is of somewhat similar structure with the field coil thereof also fixedly supported by housing 168 therewithin, which in turn is fixedly mounted to the frame sidewall 6. The annular core structure is carried by a hub keyed to the driven shaft 55. While the hub 169 of sprocket 158 is also keyed to the driven shaft 55, the drive sprocket 54 has its hub freely supported on this shaft for relative rotation and axial motion toward the keyed core structure, and sprocket 54 may be constructed of paramagnetic material to serve as the annular armature. Thus, when the field coil of the clutch unit 67–2 is energized, the drive sprocket 54 will be slid axially outward a short distance to have its outer face engage a friction facing of suitable material carried by the annular magnetic core structure keyed to the shaft, to connect the shaft and the conveyor chain driving sprockets 58 and 158 keyed thereto to the shaft drive sprocket 54. Since the magnetic brake and clutch units 67–1 and 67–2 are of conventional construction, further structural details thereof are not necessary to an understanding of their functions and operations, and they are alternately operated or energized for alternate periodic drive and pause of the chain conveyor section.

As will be understood from FIGS. 1 and 3, the support structure 3 includes an opposed pair of [upwardly extending] *upwardly-extending* standards or columns 75 and 175 which constitute supports for the elevating head unit 2, and these columns are fixedly mounted to the frame sidewalls 5 and 6 of the bed unit 1 in any suitable manner. The columns 75 and 175 preferably are of channel construction so as to provide guiding channels 76 and 176 for slides or carriage means therein that serve to carry a flap folding subassembly, and to house elevating mechanism. Opposite ends of the cross shaft 63 extend into the channels 76 and 176 and are fixedly mounted to these columns by any suitable means, such as stud bolts 77. Within the channels 76 and 176, fixed cross shaft 63 rotatably supports sprockets 78 and 178, forming a part of head elevating mechanism.

As will be understood from FIGS. 2 and 3, the bed unit 1 is equipped with suitable carton clamping and carton travel guiding means, preferably extending from the vicinity of the entrance end to a distance short of the discharge end of the bed unit 1, but entirely through the carton sensing and flap folding station in the vicinity of the discharge end of the initial conveyor section or belt 27. This carton clamping and guiding structure may be in the form of a pair of rails 80 and 180, which may be of channel formation, as shown, to provide on the inner sides thereof opposed upstanding flanges 81 and 181. As will be understood from FIGS. 2 and 3, the clamping and guiding rails 80 and 180 are suitably supported by a pair of transverse rods 82 and 83 mounted to the frame sidewalls 5 and 6. Each of the rods 82 and 83 supports a pair of slides 84 and 184 carrying bracket arms 85 and 185 to each of which is mounted one of the rails 80 and 180. Thus, the guiding and clamping rails 80 and 180 are slidably supported on transverse rods 82 and 83 for transverse movement inward and outward relative to the center of the path of carton travel defined by the longitudinally-extending conveyor means. In their outward positions, depicted in FIGS. 2 and 3, the rails 80 and 180 are at their initial carton-receptive positions to permit a carton fed over depressed gate 12 to the entrance end of the initial conveyor section belt 27 to advance therebetween. The front end of each of the rails 80 and 180 preferably is equipped with a freely rotating carton guide roller 86 to facilitate entrance of a carton therebetween.

The clamping and guiding rails 80 and 180 are slid transversely back and forth on the guide rods 82 and 83 by suitable driving mechanism. Such rail driving mechanism may be in the form of a fluid pressure motor, such as a pneumatic cylinder 87 of the double-action type having its piston head 88 equipped with a through piston rod 89. The rail driving mechanism includes lateral sprockets 90, 91, 92, 93, 94 and 95. Sprockets 90 and 92 are supported on frame sidewall 5 by a bracket 96 while sprockets 93 and 95 are supported by a similar, reversely-shaped bracket 196. Sprocket 91 is supported on sidewall 6 by a bracket 97 and a similar bracket 98 is employed to support sprocket 94 on the latter sidewall, as will be understood from FIG. 2. Lengths of link chain are lapped about the sprockets 90 to 95 incl. and anchored to opposite ends of the piston rod 89, with suitable connections to the slides 84 and 184 to drive the rails 80 and 180 transversely inward and outward. For example, a length 99 of such link chain is anchored to the right end of piston rod 89 as viewed in FIG. 2 and lapped about sprocket 90 to extend transversely to an anchor bolt 100 carried by slide 184 on slide rod 83. Slide 184 also carries another chain anchor bolt 200 to which one end of another chain length 199 is anchored, with the latter lapped about sprocket 91 to extend transversely back to another anchor bolt 300 carried by slide 84 on slide rod 83. The latter slide 84 also carries an additional anchor bolt 400 to which a third length 299 of the chain is connected, with the latter lapped about sprocket 92 to extend longitudinally back for lap about sprocket 93 and then transversely to a fifth anchor bolt 500 carried in like manner by slide 184 on slide rod 82. This latter slide 184 also carries another anchor bolt 600 to which a fourth length of chain 399 is anchored and then lapped about sprocket 94 to extend transversely back to an additional anchor bolt 700 carried by slide 84 on slide rod 82, with a further anchor bolt 800 on the latter slide having connected thereto a fifth length of chain 499 lapped about sprocket 95 to extend longitudinally forward to connection with the left hand end of the piston rod 89. Thus, when the piston rod 89 of the pneumatic cylinder 87 is slid longitudinally to the right, as viewed in FIG. 2, the clamping and guiding rails 80 and 180 are driven transversely outward to their initial carton-receptive positions shown therein, and when the piston rod is then reciprocated in the opposite direction to the left in FIG. 2 these rails are driven transversely inward toward each other for approach of their inside flanges 81 and 181 to opposite sides of a carton delivered therebetween.

The front end of guiding and clamping rail 180 carries opposite the belt conveyor section 27, in the area of the carton sensing and flap folding station an adjustable control or sensing device 115, as will be seen in FIG. 2. For the purpose of supporting the adjustable control 115 upon the guiding and clamping rail 180, the latter carries a pair of opposed brackets 125 (see FIG. 2). The brackets 125 support therebetween a pair of longitudinally-extending guide rods 126 and 226 upon which a carriage 127 is slidably mounted. Carriage 127 supports a control device 128, which may be in the form of an electrical circuit switch biased to one of its open and closed positions and manipulated to the other thereof by an actuating arm 129. The switch actuating arm 129 is elongated and extends longitudinally forward while having its mid-section shaped to be disposed substantially parallel to the inward face of flange 181 of rail 180 when retracted or swung back by contact with carton side structure. Thus, when the rails 80 and 180 are driven inward toward each other with a carton disposed therebetween opposite the control 115, the back side of the carton which is opposed to the switch operating arm 129 will first be contacted thereby. Then, as the rails 80 and 180 are brought to clamping positions against the opposite sides of the carton, this switch operating arm 129 will be retracted or pushed back to operate the switch 128. The control device comprising switch 128 and its actuating arm 129 are automatically adjustable along the path of carton forward travel as dictated by the width of the carton. For example, a narrow carton causes the clamping rails 80 and 180 to be driven inward toward each other an appreciable distance and the control device 128 will be advanced forward an appreciable distance. With wider cartons, where inward travel of the clamping rails 80 and 180 is relatively small, the control device 128 will be advanced forward only a short distance. This automatic adjustment of the position of the control device 128 is attained by substantially rigid tie means pivotally connected to the fixed structure of the bed frame and to the control carriage 127. For example, elongated rigid arm or strap 130 is pivotally mounted at 131 to bed frame wall 6, with its other end pivotally connected at 133 to the carriage 127, as will be understood from FIG. 2. Thus, as rail [80] *180* is driven transversely inward toward the center of the longitudinal path of carton forward traved, the tie 130 is swung counterclockwise to pull the control carriage 127 forward along the guide rods 126 and 226. This forward adjustment of the position of the control device 115 is proportionate to the width of the carton at the carton sensing and flap folding station.

The machine bed unit 1 also is provided with additional control equipment. As will be seen from FIG. 1, the frame of the bed unit 1 supports a limit control 135, which may be in the form of electrical circuit switching means having a plurality of switches mechanically linked together for simultaneous operation. The limit switch 135 is provided with an actuating trigger 136 designed to be swung up and down and biased to its downward position with a drag roller 137 carried by its lower end. Limit switch 135 preferably is supported upon ledge 10 beyond the head-supporting upright column 75, such as in the vicinity of the location X–1 indicated in FIG. 3, so that the roller 137 on the actuating trigger 136 will be dragged over the next oncoming traveling lug 66–1 or 66–2 carried by conveyor chain 59. When the upper run of conveyor chain 59 in its forward travel causes lug 66–1 to engage the trigger 136, the latter will be swung up to actuate the switches in the limit switch unit 135, and the circuit switches thereof will be held to their respective manipulated positions until this run of the conveyor chain advances sufficiently to free the trigger and thus permit the limit switches to be returned to their initial positions. A similar limit switch 235 preferably is mounted at location X–2 on frame ledge (FIG. 3) to be tripped by lugs 266–1 and 266–2 carried by conveyor chain 159 (see FIGS. 2, 14 and 15).

Additional sensing devices are provided on the machine bed unit 1, which may be in the form of optical carton sensing devices. For example, as will be seen from FIGS. 1 and 2, the ledge 10 may support at 138, in the vicinity of the selector gate 12 and slightly in advance thereof a photocell responsive to the light beam from a light source 139 supported on the opposite side by ledge 11. At the sensing and flap folding station [Y], *Y* ledge 10 may support in similar fashion, substantially at the point 140, a second photocell arranged opposite to a second light source for response to the beam thereof, with the latter being located substantially at the point 141. The functions of the photocells at 138 and 140 will be explained in connection with the wiring diagram of FIG. 16 and the operation of the machine detailed hereinafter.

In FIG. 1 is shown in dot-dash lines an open-top carton 134 of relatively shallow depth or short height located opposite the photocell optical sensing device 140 at the sensing and flap folding station Y, beneath a flap folding and carton closing head 142 supported for elevating travel upon the upright columns 75 and 175. Head 142 includes a lateral frame member or beam 143 which supports a flap folding sub-assembly which may include a depending post 144. The bottom end of depending post 144 pivotally carries at 145 a front flap folding arm structure 146, which, due to gravity biasing, normally depends in the top elevated position of the head 142 shown in FIG. 1 obliquely down and forward to the full line position shown in FIG. 1. The front flap folding arm structure 146 carries a finger 147 which engages a trigger 148 of another limit control, which may be an electrical circuit switch device 149 supported on the post 144. In the full line position of the front flap folding arm structure 146 shown in FIG. 1 its finger 147 holds the switch trigger 148 forward to a tripped position to hold the switch in one of its open and closed positions. When the front flap folding arm structure 146 is swung upward to a lateral position, indicated by broken lines in FIG. 1, the trigger 148 of switch 149 is released to permit the switch to be actuated to the other of its two positions. The bottom of the depending post 144 has anchored thereto, such as by welding, one end of a folded flap hold-down device in the form of a resilient presser strip 150, which extends forward with its free end unsupported, to cooperate with the front flap folding arm structure 146. As will be seen from FIG. 1, the flap hold-down strip 150 may have a continuating portion at its anchored back end, which is turned up obliquely and then inward to additional anchorage to the depending post 144, so as to provide a wedge-shaped stop 250 for a back flap folding arm or kicker hereinafter described.

The elevating flap folding head 142 also may have a forwardly extending lateral frame member A which supports suitable flap securing mechanism, which may be tape applying means of the type disclosed in our copending patent application for U.S. Letters Patent Ser. No. 139,676, filed Sept. 21, 1961, now Patent No. 3,236,716, including pairs of wipe down arms B and C, to which are supplied from a suitable tape supply reel D lengths of gummed tape to be adhesively affixed over overlapping flaps of a carton top after the flaps have been folded down in stacked or overlapping relation. Similar tape applying devices are carried by the bed unit 1, including another adhesive tape supply reel E (see FIG. 1), tape feed and drive sprockets 40, 44 and 45, tape mechanism cross shaft 47 and sprocket 46 supported thereby, tape feed actuators F (supported on rail 180, see FIG. 3) and associated structure.

The lateral frame member or beam 143 of head 142 pivotally supports at 151 a carton back flap folding arm or kicker 161 as part of the flap holding sub-assembly, as will be seen from FIG. 1. The back flap folding arm or kicker 161 is normally held in an extended or substantially lateral position when the flap folding head 142 is elevated to the maximum height of its vertical travel, as is shown in FIG. 1. For this purpose the lateral beam 143 carries a kicker actuating means, preferably in the form of a pneumatic cylinder 163, as is shown in FIG. 1. This pneumatic cylinder 163 is of the double-action type with pressurized fluid being alternately fed to opposite ends on opposite sides of its piston head by suitable conduit means. Piston rod 167 mounted to the piston head of the pneumatic cylinder 163 is connected by a knuckle to a lever arm fixed to the pivoted kicker 161. Thus, when pressurized air is supplied to the back end of pneumatic cylinder 163 the rear flap kicker 161 is swung backward and upwardly to its substantially lateral cocked position, shown in full lines in FIG. 1, with the head space of the cylinder in front of its piston head being vented. It will be seen from FIG. 1 that the bottom side of the rear flap kicker 161 is provided with a depending tapered nose 172 having an oblique rear face 173–1 which, when the kicker is swung down to its depending position indicated in dot-dash lines in FIG. 1, is oriented to substantial parallelism with the oblique stop 250. The cocked kicker 161 is swung down to this position to engage or strike the rear face of an upstanding back flap on the trailing end of the open top of a carton and kick it forward to folded lateral position by reversing the pneumatic connections to cylinder 163 to retract the piston rod 167. When the kicker 161 is swung down the oblique rear face 173–2 of its tapered nose 172 provides a flat lateral bottom surface substantially in the horizontal plane of the bottom surface 146–1 of front flap folding arm structure 146 when swung up, as are indicated in dot-dash lines in FIG. 1. These aligned bottom surfaces of the flap folding arms 146 and 161 maintain the folded front and back flaps in a common lateral plane during forward transport of the carton which effects the folding down of the side flaps.

The top of the column 75 and 175, which support the head 2 for vertical reciprocation, fixedly support at their top ends a reversing electric motor 174, as is indicated in FIG. 1. The drive of reversing motor 174 is suitably geared to a pair of top drive sprockets 177 and 277 carried by the top ends of the columns 75 and 175. Drive chain 178 is lapped about drive sprocket 177 in the vicinity of the top end of column channel 75 and about the bottom idler sprocket 78, shown in FIG. 3 with opposed ends thereof anchored by suitable means at 179 to a slide 182 riding up and down in channel 76. In similar fashion, a like chain (not shown) is lapped about the far top sprocket 277 and bottom idler sprocket 178, and is anchored in like fashion to a similar slide of reversed form located in channel 176 of column 175. The opposed pair of slides 182 are suitably tied together to act as a carriage unit. The carriage comprising the pair of slides 182 and its companion suitably support the lateral frame member or beam 143 for vertical travel down and up therewith. Thus, when the reversing vertical travel motor 174 is driven in one direction the entire head structure 2 is lowered to position its flap folding means above an open top carton at the sensing and flap folding station Y, such as carton 134 indicated in FIG. 1, and when driven in the opposite direction will lift this head structure to its initial elevated position, such as that indicated in full lines in FIG. 1.

Maximum limits of up and down motion of the head structure 2 are dictated by suitable limit means, which may be in the form of switch means in electrical circuitry of the reversing motor 174. Such switch means may be of the double-throw type so as alternately to open the energizing circuits of the reversing motor 174 to limit the down and up drive thereof. Such reversing motor control switch unit 186 is suitably mounted on slide 182. Switch unit 186 is provided with a double-action actuating trigger 187 arranged to be abutted in its up and down travel to bottom and top stop collars 190 and 193, fixed upon a vertical control rod 191 supported by bed unit frame ledge 10 and the back edge flange of column channel 75. The bottom stop collar 190 will limit lowering of the head structure 2, so as to assure that no parts thereof will be driven down to jam against any of the bed unit structure should the down energizing circuit of the reversing motor 174 accidentally be closed in the absence of a carton at the sensing and flap folding station, thus being provided as a safety measure.

As will be seen from FIG. 1, the flap folding head structure 142 includes suitable carton side flap folding plows 233 having their initial top ends at 234 mounted to the head beam 143 by a bracket block 236 and from which they extend obliquely down in an advance direction while converging toward each other. As is presently known in the art, plows of such shape will gradually turn over and fold down upwardly-extending carton flaps when they are moved forward to engagement of their outside faces against the inner sides of such plows.

As has been previously indicated each of the carton clamping and guiding members or rails 80 and 180 is provided with a carton side engaging means carried thereby or supported thereon at its inner side in the area of the sensing and flap folding station Y to constitute the means of contacting a side of a carton, pausing at this station, by structure of these members or rails. Such carton side engaging means are shown at 205 and 2050 in FIG. 2, with the parts of the latter being mirrored duplicates of those of the former. Thus, the structure of the device shown at 205 will here only be described in detail. The inward side of the clamping and guiding member or rail 80, and its inside flange 81 are provided with an elongated notch 204, and a like notch 2040 is provided in the opposed side of the cooperating or companion member or rail 180.

Figure 4:
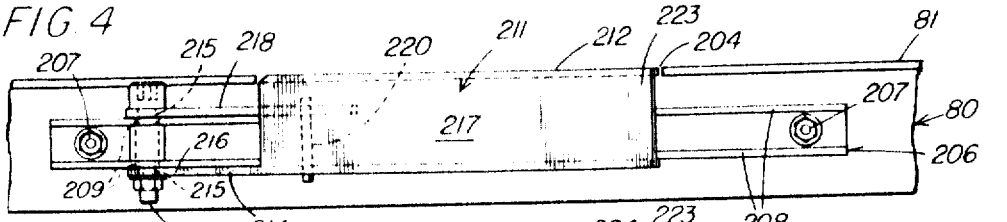
FIG. 4 is a top plan view of a section of one of the carton clamping and guiding members or rails shown in FIG. 2, with parts broken away, on which is mounted a carton side engaging means, that, by way of example and as is illustrated therein, may comprise a movable shoe capable of being alternatively elevated and retracted.
Figure 5:
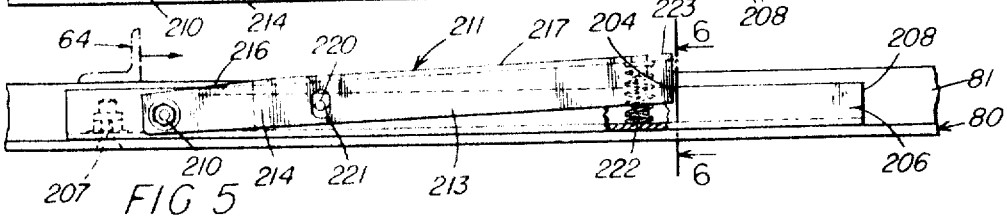
FIG. 5 is a side elevational view of the structure shown in FIG. 4, with one of the shoe operating transverse flight bars of the chain conveyor being indicated in broken lines to illustrate its service in retracting the carton side engaging shoe.
Figure 6:
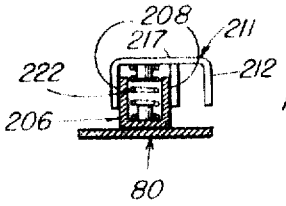
FIG. 6 is a sectional view taken substantially on line 6—6 of FIG. 5.

As will be more fully understood from FIGS. 4 to 6 incl., upon the top face of the web of rail 80 is fixedly mounted a U-shaped channel section 206 by bolts 207 with its upstanding flanges 208 provided with transversely aligned holes 209 through which extends a pivot pin or bolt 210. A shoe 211 is pivotally mounted upon the pivot pin or bolt 210. Shoe 211 is in the shape of an inverted channel section having an inward side flange 212 fitted for vertical motion in the notch or gap 204 and an outward side flange 213 provided with a rearwardly extending extension 214 having a hole 215 through which the transverse pivot pin or bolt 210 extends. As will be seen from FIG. 5, the top edge 216 of the flange extension 214 is sloped in a forward direction obliquely upward to the top face of the shoe web 217 for camming upwardly an oncoming chain conveyor transverse flight bar 64, as will be explained later. An arm 218 is welded to the underside of the web 217 and is provided with a like hole 215 aligned with that in the flange extension 214 through which the transverse pivot pin or bolt 210 extends for pivotal mount of the shoe 211.

The upstanding flanges 208 of the channel section 206 carry a transverse fixed pin 220 and the inverted flange 213 of the shoe 211 and the forward end of the arm 218 have provided therein transversely aligned slots 221 in which the projecting ends of the pin 220 ride as stop means for limiting up and down swing of the shoe 211. Upon the forward end of the channel section 206 is mounted a helical compression spring 222 upon which the forward end 223 of the pivoted shoe 211 rests so that it is spring biased upwardly.

It will thus be understood that with the pivoted shoes 211 of the carton side engaging means 205 and 2050 swung upwardly to their extended positions as dictated by the biasing of their springs 222 the opposed inward side flanges 212 will be brought to secure clamping contact against opposite sides of the carton 134 at the sensing and flap folding station Y, there to have maximum lap against the surfaces of these carton sides and to assure the provision of the minimum height of clamping action to about one and one-half inches (1½") found to be necessary to assure secure carton anchorage with properly aligned orientation of the latter. As the front flap folding operation is performed at station Y upon the carton 134 held securely clamped thereat between the clamping rails 80 and 180 the chain conveyor is started so that its top run travels forward to carry up behind the stopped carton one of the flight bars 64 and cause it to pick up this carton for carrying it forward for performance of the flap folding operation on the upstanding rear carton flap. Then as the carton is carried farther forward by forwardly traveling flight bar 64 the upstanding carton side flaps are lapped down over the folded front and rear flaps to complete the closure of the carton top after which the closed carton is carried still farther forward beneath the tape applying mechanism mounted on beam A.

As will be explained later the clamping action of the clamping members or rails 80 and 180 is converted to a guide operation by reducing the clamping force to a low biasing pressure so as to permit the closed carton to be so carried forward from the flap folding station Y with guidance by these opposed rails. During this forward transport of the closed carton by the transverse flight bar 64 the upwardly projecting clamping shoes 211 which have their forward ends intercepting the path of forward travel of the transverse flight bars must be lowered to permit free [pasage] *passage* of the latter. The oncoming flight bar 64, indicated in broken lines in FIG. 5 will ride along the upwardly sloping top edge 216 of the shoe web 217 and over the latter to depress each shoe 211 for permitting such free passage of the flight bar. In order that the attendant frictional drag between the bottom of each flight bar 64 and the top structure of each pivoted shoe 211 will not cause such rapid wear as to undesirably limit the life of the shoe structure the flight bar, or at least its bottom section, and the shoe, or at least its top section, advantageously may be made of steel and surface hardened. Alternately such friction surfaces may be protectively covered by tough friction reducing material, such as Teflon or similar composition.

As has been previously indicated means for stopping each oncoming carton at the flap folding station Y, for performance thereon of the front flap folding operation, thereafter to be withdrawn to permit the carton to be picked up by the chain conveyor and transported forward, may be a reversed transverse flight bar of the type and function taught in our prior application Ser. No. 219,212. However, this function may be performed by movable gate means illustrated at 224 in FIG. 2 and shown in detail in FIGS. 7 and 8. This stop gate means may be in the form of a lift gate which in its elevated position intercepts the carton path and which may be retracted or lowered out of this path at the proper time.

It is preferred that such movable gate means 224 be in the form of a pivoted stop paddle structure 225 having a journal 226 through which a transverse pivot pin 116 extends. Movable gate means 224 is supported by means of a pair of longitudinal plates 117 supported on transverse rods 65 and 83 of the machine frame, and these plates are tied together by a tie bolt structure 118 (see FIGS. 2, 7 and 8). Plates 117 support the transverse pivot pin 116. For the purpose of swinging this paddle structure 225 rearwardly up to intercept the carton path and swinging it forwardly down to a retracted position a pneumatic motor is provided which includes a cylinder 227 suitably supported at its back end 228, such as by ears 119 which pivotally receive therethrough tie bolt 118 for swinging motion of this cylinder, and the latter carries a reciprocating piston head 229 (see FIGS. 9 to 13 incl.). The piston structure of this pneumatic motor includes with the piston head 229 a piston rod 230 extending from out of the other end 231 of the cylinder 227 for driving connection with the pivoted stop paddle structure 225, such as by means of connector knuckle 232. Thus, when the piston rod 230 is thrust forward, i.e., back toward the entrance end of the machine, it will swing the pivoted paddle structure 225 counterclockwise to lift it up into the carton travel path to constitute a stop for each carton as the latter is moved up by the conveyor means into the flap folding station Y, as is indicated in FIG. 2. This stop paddle structure 225 will be retracted out of the carton travel path by clockwise swing forward upon retraction of the piston rod 230. Such reciprocative action of the piston rod 230 with attendant elevation and retraction of the stop gate paddle structure 225 will be explained more fully in connection with FIGS. 9 to 14 incl.

In FIGS. 9 to 11 incl. are shown diagrammatically pneumatic circuitry for association with and control of the clamping rail driving motor 87 including a source of pressurized gaseous medium or air and a pair of solenoid valves. It is therein proposed also to associate with such pneumatic circuitry the pneumatic means for controlling and manipulating the movable gate means 224 in the form of the pivoted stop paddle structure 225. As will be seen from FIGS. 9 to 11 incl. the pneumatic motor 87 includes a double-ended cylinder 301 in which is reciprocatively mounted piston head 88 provided with a through piston rod 89 fixed thereto. One end 302 of the cylinder 301 has projecting therethrough leading section 303 of the double-ended piston rod 89 to which the initial section of the traverse chain 99 is connected for moving or driving the spread-apart clamping and guiding rails 80 and 180 from their initial positions of FIG. 2 inward toward each other to clamping of an intervening carton at the station Y upon inward motion of this piston section. The other end 304 of pneumatic motor cylinder 301 has projecting therethrough the other end section 305 of the double-ended piston for connection to the traverse chain section 499 which, upon outward travel, cooperates in such inward drive or approach of these clamping rails 80 and 180. In FIG. 9 the initial position of the piston head 88, as would be occupied under the FIG. 2 conditions, is indicated in dotted lines at 188, and it is shown traveling to the left for effecting the drive of the clamping rails 80 and 180 inward toward each other to opposite sides of a carton stopped at the flap folding station Y.

The pneumatic circuitry diagrammatically illustrated in FIGS. 9 to 11 incl. is shown in FIG. 9 as including a pair of solenoid valves 194 and 195. Since the main pressurized air supply, indicated at 306, is connected directly to one orifice of the solenoid valve 195 and thence through the next solenoid valve 194 to the pneumatic motor cylinder 301, solenoid valve 195 will be here identified as a first such valve, and solenoid valve 194 will here be considered as a second such valve. The solenoid valves 195 and 194 are modified forms of four-way valves. The first solenoid valve 195 has two orifices on the outlet side thereof, i.e., I*v*1 and II*v*1, indicated respectively at 307 and 308. This first solenoid valve 195 also has three orifices on the inlet side thereof, i.e., III*v*1, IV*v*1, and V*v*1, indicated respectively at 309, 310 and 311.

Similarly, the second solenoid valve 194 has two orifices I*v*2 and II*v*2 on its outlet side respectively indicated at 312 and 313. The second solenoid valve 194 also has on its inlet side three orifices III*v*2, IV*v*2 and V*v*2 respectively indicated at 314, 315 and 316.

The third and fifth orifices of solenoid valve 195, at 309 and 311, alternately serve as vents to atmosphere, and the fifth orifice at 316 of the second solenoid valve 194 periodically serves as a similar vent.

The supply of pressurized air 306 is connected by a conduit 317 through a regulator 318 to the fourth orifice of solenoid valve 195 at 310, and its second orifice at 308 is connected by a conduit 319 to the fourth orifice 315 of the second solenoid valve 194. The supply of pressurized air 306 is also connected by a conduit 320 through a regulator 321 to the third orifice 314 of the second solenoid valve 194. The first and second orifices at 312 and 313 of the second solenoid valve 194 are respectively connected by conduits 322 and 323 to first and second ducts or passages at I and II at 324 and 325 which communicate with the chamber of the pneumatic motor cylinder 301 at its respective ends 302 and 304. The regulator 318 is set to provide a relatively high pressure of the gaseous medium or pressurized air, e.g., forty-five pounds per square inch (45 lbs./sq. in.), and that at 321 is set to provide a relatively low pressure of the gaseous medium or pressurized air, e.g., five pounds per square inch (5 lbs./sq. in.).

It may be found desirable to apply greater gaseous pressure to the stop gate operating cylinder 227 than that which is applied to the rail driving cylinder 301 as the relatively high pressure is fed to the latter. This may become desirable in connection with the handling of relatively heavily loaded cartons which entails application of appreciable positive pressure to the stop gate operator 229 to assure that the stop gate 225 will effect the required positive stoppage of such cartons at the flap folding station Y, while limiting the maximum pressure feed to the rail driving cylinder 301. This may be accomplished in a simple manner by moving the pressure regulator 318 out of the conduit 319 to a point intervening orifice 315 of the second solenoid valve 194 and the interconnection between conduit 319 and the conduit 332 which deliver the relatively high pressure to the stop gate operating cylinder 227, such as to the alternate point indicated at 318a in FIG. 9. As a consequence, the pressure of the source 306 may be raised to that determined to be sufficient to bias the carton stop gate 225 to its up position under all conditions of maximum load demand while assuring that the maximum pressure supplied to the rail driving cylinder 301 through the solenoid valve 194 will be limited to a lower value, such as forty-five pounds per square inch (45 lbs./sq. in.), as dictated by the regulator [319, when the later] *318, when the latter* is located at the point 318a.

With the clamping rails 80 and 180, their traverse equipment and the piston structure of the pneumatic motor 87 in the initial positions illustrated in FIG. 2, energization of both of the solenoid valves 195 and 194 by means hereinafter described in connection with the diagrammatic showing in FIG. 16 of the electrical and pneumatic circuitries, pneumatic flow passages through these valves illustrated in FIG. 9 are attained. Thus, inlet orifice 310 of the first energized solenoid valve 195 is connected by a cross-passage 326 to its orifice 308 for feed through conduit 319 to orifice 315 of the second energized solenoid valve 194. Orifice 315 of energized solenoid valve 194 is connected by a cross-passage 327 to its orifice 312, whereby the relatively high pressure air is conducted through conduit 322 to the forward end 302 of the cylinder 301, so as to thrust the piston 88 in the latter back from its position at 188 toward its terminal position 288, both such positions being indicated in dotted lines. This action will cause the traverse chain 99–499 to drive the clamping rails 80 and 180 inward from their initial widely spread-apart positions toward each other with their clamping shoes 211 approaching to abutment of opposite sides of the carton 134 temporarily held stopped at the flap folding station Y by lift or stop gate 225. During such feed of the relatively high pressure air to the forward end 302 of the chamber of the pneumatic motor cylinder 301 air in the latter on the opposite side or behind the piston head 88 will be bled out through conduit 323 to orifice 313 of the second energized [solanoid] *solenoid* valve 194 for venting through orifice 316 thereof by a cross-passage 328.

After the front flap on the leading end on the carton 134, while the latter is clamped at the station Y, is folded back and downward upon the top of this carton the chain conveyor is started up to carry forward one of its transverse flight bars 64–1 and 64–2, so that the latter is brought up behind this carton to pick it up and transport it forward between the opposed rails 80 and 180 in their inward [position] *positions* which now serves as guides. For this purpose, the clamping pressure must be relieved to an appreciable degree so as to permit such slide of the carton between these now lightly elastically biased rails 80 and 180 in their inward positions. This is accomplished by deenergizing both of the solenoid valves 195 and 194 to manipulate them for establishing the flow passages therethrough illustrated in FIG. 10. Now the relatively high pressure or gaseous medium delivered through conduit 317 is cut off at the first de-energized solenoid valve 195 from communication to the pneumatic motor cylinder 301. However, the relatively low pressure gaseous medium is delivered through conduit 320 to orifice 314 of the second de-energized solenoid valve 194 for feed through its cross-passage 329 to orifice 312 for delivery by conduit 322 to the forward end 302 of the chamber of the cylinder 301. At the same time the air in the other end 304 of the cylinder 301 located on the opposite side of piston head 88 is continued to be vented through conduit 323 and now cross-passage 330 established between orifices 313 and 315 of de-energized solenoid valve 194, thence via conduit 319 and finally from orifice 308 to vent orifice 311 by way of cross-passage 331 of de-energized solenoid valve 195. As a result, the rails 80 and 180 are elastically biased to opposite sides of the carton 134 under relatively light pressure, such as five pounds per square inch (5 lbs./sq. in.) to permit the carton to slide forward therebetween.

As will be best understood from the following description of operation in connection with the showing in FIG. 16 a very short period may intervene the attainment of the conditions depicted in FIGS. 9 and 10. During this period the solenoid valve 195 may be de-energized shortly before solenoid valve 194 is de-energized so that valve 195 is conditioned as shown in FIG. 10 while valve 194 remains energized as is indicated in FIG. 9. In this event solenoid valve 195 will feed the relatively high pressure air across from orifice 310 to orifice 307 for conduction by conduit 333 to the front end 231 of cylinder 227, thereby effecting retraction of stop gate 225. This is accompanied by venting the back end 228 of cylinder 227 through conduit 332, orifice 308, passage 331 and out vent orifice 311. As this occurs both supplies of pressurized air are cut off from communication with the clamping rail traverse cylinder 301, the relatively high at orifice 310 and the relatively low at orifice 314. The inwardly positioned clamping rails 80 and 180 remain abutted against the opposite sides of the carton at the flap folding station for the short time until the condition of FIG. 10 is attained to apply relatively low biasing pressure to these rails.

When the succeeding carton is admitted into the entrance end of the machine and fed forward toward the flap folding station Y the first solenoid valve 195 again becomes energized while the second solenoid valve 194 remains de-energized. The condition of the pneumatic circuitry associated with the pneumatic motor 87 at such time is illustrated in FIG. 11. It will there be seen that now the relatively high pressure gaseous medium is again fed through conduit 317, e.g., at forty-five pounds per square inch (45 lbs./sq. in.), to the energized first solenoid valve 195, through its cross-passage 326 to conduit 319, and thence through cross-passage 330 through the de-energized second solenoid valve 194 to conduit 323, to be supplied through the back end 304 of pneumatic motor cylinder 301 behind the piston head 88 for urging the latter forward, back to its initial position 188. At the same time relatively low pressure gaseous medium, e.g., at five pounds per quare inch (5 lbs./sq. in.), is supplied through conduit 320 and by way of cross-passage 329 through de-energized second solenoid valve 194 and conduit 322 to the forward end 302 of the pneumatic motor cylinder 301, ahead of the piston 88 therein. The differential in pressures on opposite sides of the piston 88, e.g., forty pounds per square inch (40 lbs./sq. in.), is thus applied behind the piston head 88 to thrust it forward toward its initial position 188, so as to return the rail traversing equipment back to its initial positions of FIG. 2. This action retracts the rails 80 and 180 away from each other, so as to spread them apart for receiving therebetween the next succeeding carton as it enters the entrance end of the machine.

The action described above in connection with FIGS. 9, 10 and 11 is then repeated with this next carton as it is fed forward by continually traveling endless conveyor belt 27 to the flap folding station Y. As has been previously indicated, stop mechanism is required at the forward end of the flap folding station Y, intercepting the path of forward travel of this succeeding oncoming carton, so as to stop it in proper position for lowering of the elevating head 2 down thereover to effect the initial flap folding operation, i.e., the folding back and down upon the top end of the carton its upstanding leading flap. As is pointed out above the stop mechanism to intercept this oncoming carton and cause it to pause at the flap folding station Y may be in the form of a retracted gate, such as that shown at 225 in FIGS. 1, 2, 7 and 8 or in FIGS. 9, 10 and 11, which is to be lifted into a carton path intercepting position for abutment thereagainst of the leading end of the succeeding carton. As will be seen from the diagrammatic showing of the pneumatic circuitry in FIGS. 9 and 11 the pneumatic cylinder 227 and its piston structure 229, 230 may perform this gate lifting operation by having the back end 228 of the chamber in this cylinder connected by a conduit 332 to the interconnecting conduit 319, to supply thereto, behind piston head 229 the relatively high pressure gaseous medium, e.g., at forty-five pounds per square inch (45 lbs./sq. in.), to thrust this piston head forward causing piston rod 230 to raise the stop gate 225 to its full line position shown therein. This action occurs when first the solenoid valve 195 is energized, and may happen when the clamping rails 80 and 180 are in their relative inward clamping positions and while solenoid valve 194 is de-energized, as depicted in FIG. 11, so that these clamping rails will be driven away from each other to their spread-apart positions of FIG. 2, to be maintained in this up carton intercepting position as solenoid valve 194 is then energized, as indicated in FIG. 9, to drive these spread-apart rails inward toward their carton clamping positions. In starting up operation of the inactive machine the stop gate 225 is raised immediately when the circuitry is first supplied with power causing solenoid valve 195 to be immediately energized, as will be explained in the description of FIG. 16. Thus the stop gate 225 is raised to its intercepting position to stop the next oncoming carton at the flap folding station Y and then the clamping rails 80 and 180 are brought snugly against opposite sides of the stopped carton at the flap folding station, with their clamping shoes 211 abutted to opposite sides of the carton under relatively high clamping pressure, e.g., forty-five pounds per square inch (45 lbs./sq. in.). With the application of the relatively high pressure gaseous medium behind the piston head 229 the gaseous medium or air in the head end 231 of the chamber of the cylinder 227 was vented by a conduit 333 connected to orifice 307 of the first energized solenoid valve 195 for venting through cross-passage 334 of the latter and its vent orifice 309.

As will be seen from FIG. 10 when both solenoid valves 195 and 194 are then de-energized, the relatively high pressure gaseous medium is supplied through orifice 310 and cross-passage 335 of the first de-energized solenoid valve 195 to be fed through conduit 333 to the head end 231 of the chamber of stop gate cylinder 227. This causes the relatively high pressure to be applied to the opposite side or in front of the piston head 229 to cause it to retract piston rod 230 and effect attendant retraction or lowering of the stop gate 225. This gate retraction releases the carton for further forward transport at the time the inwardly located clamping rails 80 and 180 become biased with relatively low pressure gaseous medium to convert them to guiding rails. By reference to FIG. 11 it will be seen that when the first solenoid valve 195 again becomes energized with maintenance of the de-energization of the second solenoid valve 194 retraction of the guiding rails 80 and 180 is begun and again relatively high pressure gaseous medium is fed to behind piston head 229 in the cylinder 227 to thrust it toward its maximum position of advance 229–1 for raising the gate 225 to its carton stopping position 225–1.

This cycle of operation of lifting and retracting the carton stopping gate 225 is cyclically performed simultaneously with the recycling operations of the inward drive and outward retraction of the rails 80 and 180, as are illustrated in FIGS. 9, 10 and 11.

It is to be understood that the alternate lifting and retraction of the stop gate 225 need not depend upon alternate pneumatic drive of its operating mechanism, such as the piston 229 of cylinder motor 227. As will be seen from FIGS. 12 and 13 the interconnecting conduit 332, which in FIGS. 9, 10 and 11 connects the back end of the chamber of cylinder 227 to the interconnecting conduit 319 for supply of relatively high pressure gaseous medium thereto periodically, may be omitted. In such case the stop gate mechanism 2240 may include a helical compression spring 336 mounted within the cylinder 2270 behind the piston head 229, with the back end 2280 of this cylinder vented, such as is indicated at 337. Such compression spring 336 thus constitutes the motor which thrusts the piston head 229 forward to cause piston rod 230 to raise the stop gate 225 to its carton path intercepting position, as is indicated in FIG. 12. This expansion of the motor spring 336 is permitted when the front end 231 of the cylinder 2270 is connected by means of conduit 333 to the vent orifice 309 by way of cross-passage 334 of the first energized solenoid valve 195, with the cylinder chamber behind the piston head 229 being permitted to aspirate air through vent 337. Thus this lifting force is applied to the stop gate 225 to lift it up to its carton path intercepting position and takes place at all times that retracting pressure is not applied to the front end 231 of cylinder 2270, including the time when the opposed rails 80 and 180 are driven more progressively inward toward opposite sides of an oncoming carton, so as to stop the latter at the flap folding station Y, there ultimately to be securely clamped by these rails and their clamping shoes 211.

As will be seen from FIG. 13 when both of the solenoid valves 195 and 194 are de-energized to apply relatively low pressure gaseous medium to the opposite side of the piston head 88 in the cylinder 301 of rail driving pneumatic motor 87 for conversion of these rails to carton guiding means the relatively high gaseous medium, e.g., at forty-five pounds per square inch (45 lbs./sq. in.), is supplied from conduit 317 through cross-passage 325 of the first deenergized solenoid valve 195 and by way of conduit 333 to the front end of 231 of the cylinder 2270 so as to retract the piston head 229 and its piston rod 230 for withdrawing the stop gate 225 from the path of the carton to allow it to be transported forward from the flap folding station Y. This action compresses the motor spring 336 with vent of air through the vent 337. This condition of FIG. 13 is maintained until the first solenoid valve 195 is again energized, such as while the de-energization of the second solenoid valve 194 is maintained for effecting the retraction of the guiding rails 80 and 180 from each other to permit reception of the next oncoming carton, as in FIG. 11, at which time feed of relatively high pressure gaseous medium to the front end 231 of cylinder 2270 is cut off to permit the spring 336 again to raise the stop gate 225.

As will be seen in FIGS. 14 and 15 lugs 266–1 and 266–2 carried by the far conveyor chain 159 are of appreciable length, being about thirty inches (30″) long in an operative embodiment of the machine depicted by way of example in the drawings. As was previously indicated these lugs 266–1 and 266–2 are provided for successively engaging beneath roller 237 on the [tip of] *tip end of* trigger 236 which manipulates a second limit switch 235, the latter being biased to one condition of circuit control and when its trigger is tripped upwardly by either of such lugs carried therebeneath to manipulate it to another condition of circuit control. These lugs 266–1 and 266–2 are of the appreciable length shown so that the second condition of circuit control effected by the tripping may be maintained for a proper time release. The relative positions of the [pair limit] *pair of limit* switch tripping lugs 66–1 and 66–2 with respect to tripping lugs 266–1 and 266–2 are shown therein by the bracketing of the positions of the former (not viewable in FIGS. 14 and 15) for an understanding of the relative timing of the operations of the limit switches 135 and 235, respectively controlled by the switch tripping lugs 66–1 and 66–2 on the conveyor chain 59 and the switch tripping lugs 266–1 and 266–2 carried by the conveyor chain 159. The operations illustrated in FIGS. 14 and 15 and the actions dictated thereby are here explained in connection with the operational details described with reference to the circuitry shown in FIG. 16.

As is illustrated in FIG. 16 the electrical circuitry of the machine, shown by way of example in the accompanying drawings, includes AC power supply lines L1, L2 and L3, to which are connected in parallel circuits to supply such power to main motor 51 and AC reversing starter switches 253 and 254 of the vertical motion motor 174. Starter switches 252 are closed by energization of a relay coil 2520. The Up starter switches 253, which dictate drive of motor 174 in one direction for the lift of the head 2, are closed by energization of a relay coil 2530, and the Down starter switches at 254, which dictate reversed drive of this motor for lowering the head, are closed by energization of relay coil 2540. A brake coil 255 is associated with motor 174 to hold it in stopped position. A rectifier circuit 256 for converting AC power to DC energy supplies the latter to magnetic brake 67–1 and magnetic clutch 67–2 through parallel circuits between conductors 342 and 343 thereof, and these parallel circuits are alternately closed. The circuit of the magnetic brake 67–1 includes a biased-closed switch 256–1 and the circuit of the magnetic clutch 67–2 includes a biased-open switch 256–2, and these switches are tied together for simultaneous alternate opening and closing by a relay coil 2560. Since relay coil 2560 is initially de-energized, the brake circuit switch 256–1 remains closed with the brake applied to the drive of the chain conveyor 59–159. In the illustrated machine it is desirable to connect the clutch switch 256–2 to conductor 342 alternately through a voltage reducer 344 and a full voltage line 345 respectively by means of a normally closed switch 341–2 and a normally open switch 341–3 tied together for simultaneous manipulation.

The rectifier circuit 256 also supplies DC power to a photocell system 1380, which includes the photocell 138 in the vicinity of the entrance selector gate 12 (see FIG. 1) and a light source 139 arranged on the opposite side of the machine for directing a photocell exciting beam upon this photocell (see FIGS. 14 and 15), and a photocell system 1400, which includes the photocell 140 at the sensing and flap folding station Y (see FIG. 1) and its exciting light source 141 on the opposite side of the machine (see FIGS. 14 and 15). The energizing circuit for the photocell systems 1380 and 1400 includes a normally open switch 262–1 which is to be closed by energization of a relay coil 2620.

A normally open switch 259, which is to be closed manually to effect initial operation of the machine, is connected in series with the relay coil 2620 in one of a plurality of parallel circuits connected to neutral line N of the power supply circuit for bridging across the latter. Another one of these parallel circuits includes a normally open Start push button switch 263 connected in series with the relay coil 2520 which controls the main motor starter switches 252. The Start push button switch 263 is shunted by a holding circuit which includes a magnetic overload switch 265 and a normally open switch 252–4 controlled by relay coil 2520, so that when the latter is energized this holding circuit will continue to supply energy to the branch circuits leading from this Start push button switch. There is connected to the parallel circuit which includes in series the Start push button switch 263 and the relay coil 2520, at a point therebetween, a branch circuit which includes in series a normally closed switch 262–2, which is under the control of relay coil 2620, and the relay coil 2560. This normally closed switch 262–2 is shunted by a holding circuit which includes in series a normally open switch 262–3, also under the control of relay coil 2620 and a held open switch 135–1 which is biased toward closure. To the same common point of connection between the Start push button switch 263 and the relay coil 2520 is connected another branch circuit which includes a held open head switch 149–1 that is biased toward closure, a conductor 101 which leads to a normally open switch 341–1 that is tied to normally closed switch 341–2 and normally open switch 341–3 for simultaneous manipulation, a held closed switch 135–2 which is biased toward open position, and a conductor 102 connected to the branch line which includes in series the normally closed switch 262–2 and the relay coil 2560 at a point intermediate these latter switch and relay coils. A relay coil 3410 is connected between conductor 101 and the neutral line N to be in parallel with the normally open switch 341–1, held closed switch 135–2 and relay coil 2560. Relay coil 3410 when de-energized under the conditions depicted in FIG. 16 permits switches 341–1 and 341–3 to remain open and switch 341–2 to remain closed, and when energized closes switches 341–1 and 341–3 and opens switch 341–2.

Held open switch 135–1, which is biased toward closure, and switch 135–2, which is held closed and biased toward open condition, are tied together for simultaneous manipulation. These two switches are embodied in the limit switch 135 that is under the control of the trigger 136 which is periodically tripped successively by the lugs 66–1 and 66–2 carried by the conveyor chain 59 (see FIG. 1). For example, when the lug 66–1 is beneath the trigger 136 of limit switch 135 to trip it up and hold it in such tripped position switch 135–1 is open and switch 135–2 is closed, as is indicated in FIG. 16, and they are held in these respective conditions by the maintenance of this tripping by this lug located beneath the roller 137 of the tripping trigger 136, as in FIG. 1.

A branch circuit is connected to the common point between the Start push button switch 263 and the relay coil 2520 through normally open switch 262–3 (by connection to the mentioned shunt circuit between the latter and the held open switch 135–1) with this branch circuit including in series a biased closed switch 235–1 of limit switch 135, normally open photocell switch 140–1, a held closed head switch 149–2 which is biased toward open position, a biased closed travel limit switch 186–1 and the relay coil 2540, thence to the neutral line N. At a point intermediate the normally open photocell switch 140–1 and the held closed head switch 149–2 and the neutral line N is connected a branch circuit including the energizing winding of solenoid valve 194. Beyond the biased closed limit switch 235–1 is provided a second branch circuit for simultaneous control with the immediately precedingly described branch circuit, this second branch circuit including in series a conductor 268 connected to this intermediate point ahead of photocell switch [140–1, second] *140–1, a second* normally closed photocell switch 140–2, a normally closed manual switch 272, another biased closed travel limit switch 186–2 and the relay coil 2530, thence to connection with the neutral line N. To the common connection between photocell switches 140–1 and 140–2, intermediate the biased closed limit switch 235–1 and the normally open photocell switch 140–1 is connected another branch conductor 267 which includes a normally closed manual switch 274, another held closed head switch 149–4 which is biased toward open position, and the winding of solenoid valve 195, thence to the neutral line N. The normally open photocell switch 140–1 and the normally closed photocell switch 140–2 are tied together for simultaneous manipulation when the photocell system 1400 is energized by a light beam emanating from light source 141 failing upon photocell 140 (in the absence of an intervening carton at the flap folding station Y). Thus, when the photocell system 1400 becomes de-energized (by interception of this light beam emanating from light source 141 to prevent it from impinging upon photocell 140 as a result of intervention by a carton) normally open photocell switch 140–1 is closed and its companion switch 140–2 is opened.

A pair of normally open manual switches 273 and 275 are respectively connected in parallel circuit conductors 276 and 277 with normally open switch 273 leading to connection with biased closed travel limit switch 186–2. The normally open manual switch 275 is connected by a conductor 103 to a point intermediate the held closed head switch 149–4 and the winding of solenoid valve 195. The bank 271 of manually and simultaneously operable switches, consisting of normally closed switches 272 and 274, and normally open switches 273 and 275, are provided so as to permit quick and ready freeing by a single manual act of a damaged carton in the machine. Thus no further consideration [need given] *need be given* here to this bank 271 of manual switches with respect to the operation of the machine in successively closing a plurality of random sized cartons.

Parallel circuit 278 includes in series normally closed switch 262–4 and the winding of selector entrance gate solenoid valve 197, this normally closed switch being [opened energization] *opened upon energization* of relay coil 2620 so that the selector gate 12 is initially in its up, carton-barring position shown in FIG. 1. Parallel circuit 269 has connected in series therein a normally open switch 262–5, a second biased closed limit switch 235–2, a normally open photocell switch 138–1 and a relay coil 2660, thence to the neutral line N. A cross-connection between parallel circuits 269 and 278 is provided through a normally closed switch 266–1 between a point intervening biased closed switch 235–2 and normally open photocell switch 138–1, and a point intervening normally closed switch 262–4 and entrance gate solenoid valve 197. Thus, when switch 262–5 is closed by energization of relay coil 2620 upon initial closure of the manual switch 259 with resulting opening of switch 262–4 (also associated with this now energized relay coil) the entrance gate solenoid valve 197 will be energized for a short period to permit entrance of an open carton at the position Z in FIG. 1 to the machine for closing, as will be explained more fully later in connection with the description of a typical operation of the machine. The entrance of such carton to the machine will cause it to intercept the beam of light impinging upon the photocell 138 at the entrance gate so as to stop excitation thereof and effect closure of the photocell switch 138–1. Thus the relay coil 2660 becomes energized to open its normally closed switch 266–1 for de-energizing entrance gate solenoid valve 197 and closing its normally open switch 266–2 which is shunted around photocell switch 138–1 to provide a holding circuit for this relay coil. This circuitry also has associated therewith another energizing circuit for the relay coil 2560. This other energizing circuit for relay 2560 consists of a conductor 104 having one end connected between the relay coil 2660 on the one hand and the switches 266–2 and 138–1 on the other hand. The other end of conductor 104 is connected between the switches 341–1 of relay coil 3410 and the conveyor operated limit switch 135–2. Conductor 104 has therein a second photoswitch 138–2 which is normally closed to be opened when the photocell 138 is de-excited.

Another parallel circuit which provides for alternate retractive and flap-folding striking action of the back flap kicker 161 is provided and includes in series biased closed sensing switch 128, a held open head switch 149–3 which is biased toward closed position and solenoid valve 198 which operates the back flap kicker.

It will thus be seen that relay coil 2620 controls five switches, viz., normally open switches 262–1, 262–3, and 262–5 and normally closed switches 262–2 and 262–4. It will also be seen that the relay coil 2520 controls four normally open switches, viz., the three in the power supply lines connected to the main motor 51 and holding circuit switch 252–4 shunted around the Start push button 263. Relay coil 2560 manipulates simultaneously the normally closed brake circuit switch 256–1 and the normally open clutch circuit switch 256–2. The relay coil 3410 simultaneously manipulates its normally open switches 341–1 and 341–3 and its normally closed switch 341–2. The head switch 149, which is carried by the elevating head 2 and is manipulated by the front flap folder arm 146, has embodied therein four switches, viz., held open switches 149–1 and 149–3 which are biased toward closed positions and held closed switches 149–2 and 149–4 which are biased toward open positions. Entrance gate photocell 138 simultaneously controls normally open photocell switch 138–1 and normally closed photocell switch 138–2. Flap folding station photocell 140 simultaneously controls normally open photocell switch 140–1 and normally closed photocell switch 140–2. Held open limit switch 135–1 which is biased toward closed position and held closed limit switch 135–2 which is biased toward open position are tied together for simultaneous operation by tripping of the limit switch 135 upon travel therepast of tripping lugs 66–1 and 66–2 carried by conveyor chains 59. Biased closed limit switches 235–1 and 235–2 are tied together and embodied in limit switch 235 which is operated periodically by travel therepast of the tripping lugs 266–1 and 266–2 carried by the other conveyor chain 159. The biased closed switches 186–1 and 186–2 in the head lowering and elevating circuits are embodied in the switch 186 carried by the elevating head 2 with switch 186–1 being opened upon contact of the switch trigger 187 with the bottom trip collar 190 to limit downward movement of this head and with switch 186–2 being opened upon trip of this trigger by top collar 193 upon raising of the head (see FIG. 1).

Operation on random size cartons which may include some of 3" to 4½" depth

The machine illustrated by way of example in the drawings, when equipped with electrical and pneumatic systems diagrammatically depicted in FIGS. 9, 10, 11 and 16, will operate as follows when a series of cartons of random size are fed to the entrance end thereof by the supply conveyor 9. Such random size cartons may include some relatively small ones which have shallow depths in the range of about three to four and one-half inches (3"–4½"), or may consist of all such small cartons. Reference should be made to the wiring diagram of FIG. 16. The power is turned on to feed current to main supply lines L1, L2 and L3, the switch 259 is closed manually to energize relay coil 2620 and the "Start" push button switch 263 is closed to energize relay coil 2520. Resulting energization of relay coil 2620 closes its normally open switches 262–1, 262–3 and 262–5 and opens its normally closed switches 262–2 and 262–4. The energization of relay coil 2520 closes starter switches 252 to effect continued drive of the main motor 51 (FIGS. 1 and 3) and holding switch 252–4 shunted around push button switch 263 to continue the energization of this relay coil. With the supply of power to the FIG. 16 circuitry the rectifier circuit 256 was also energized. The drive of main motor 51 effects constant drive of initial belt section 27 of the conveyor means.

The second section of the conveyor means, which is preferably in the form of a chain conveyor provided with a pair of uniformly spaced transverse flights bars 64–1 and 64–2, is held in stop position by virtue of the fact that tripping lug 66–1 is located beneath the trigger 136 of limit switch 135 to hold it up so as to maintain open position of its switch 135–1 and the closed position of its switch 135–2. This chain conveyor 59–159 will not be driven until relay coil 2560 is energized and thus the coil of brake 67–1 remains energized through closed brake switch 256–1 to prevent movement of this conveyor section.

Let it be assumed that a supply of succeeding cartons is provided on the feeding roller conveyor 9 and that the first carton thereof, such as 134 when in the position Z, was initially barred from entering by the lifted entrance gate 12, as is illustrated in the left hand end of FIG. 1 with respect to another carton therefollowing. When the power was turned on selector entrance gate solenoid valve 197 became energized through normally closed switch 266–1 so as to temporarily retract this selector gate and permit the leading edge of the bottom of this first carton to enter thereover. As the leading edge of the bottom of this first carton at Z enters over the retracted selector gate 12, the beam of light from the light source 139 which impinges upon the photocell 138 to excite it is interrupted and the excitation of the latter is thus discontinued to effect closure of its normally open photoswitch 138–1 and to open its normally closed photoswitch 138–2. This closure of photoswitch 138–1 causes relay coil 2660 to be energized for opening its normally closed switch 266–1 so as to deenergize entrance gate-operating solenoid valve 197. Consequently, the selector gate 12 is allowed to raise and lift its roller 17 beneath the bottom of the entering carton which permits the latter to glide forward onto the constantly driven conveyor belt 27 while positioning the carton-barring gate flange 16 into the path of the next oncoming carton supplied by feed conveyor 9, such as 234 which will now occupy position Z. The driven conveyor belt 27 transports this first carton 134 forward to between the retracted guide rails 80 and 180 and on toward the sensing and flap folding station Y until the front or leading end of this carton is brought to abutment of the lifted stop gate 225 (see FIG. 1).

As soon as power was supplied to the rail traverse and stop gate operating solenoid valve 195 became energized through the switch 262–3 (closed by the energization of relay coil 2620), the closed limit switch 235–1, conductor 267 including closed manual switch 274 and the held closed head switch 149–4. Since solenoid valve 194 remained deenergized by virtue of the open condition of its circuit at normally open photoswitch 140–1 the conditions of FIG. 11 were obtained to assure that the clamping rails 80 and 180 were spread apart to their fully retracted positions for reception of this oncoming carton therebetween and to effect the lift of the stop gate 225 to its carton stopping position for holding this carton at the flap folding station Y.

As this open-top carton 134 was delivered to the constantly driven conveyor belt section 27 and carried forward a short distance to clear the beam of light projected by the light source 139 toward the photocell 138, such as in the broken line position illustrated in FIG. 14, the resulting re-excitation of this photocell again permitted the photocell switch 138–1 to open and the photocell switch 138–2 to close. Since, during the closure of photocell switch 138–1 while the carton 134 was traveling from the position Z to the broken line position shown in FIG. 14, its photocell switch 138–1 was closed to energize relay coil 2660 and caused the latter to close its normally open holding switch 266–2 energization of this relay coil will be continued through this now closed holding switch and the latter will deliver current through closed photoswitch 138–2, conductor 104, held closed limit switch 135–2 and conductor 102 to energize relay coil 2560. Relay coil 2560 had been de-energized since switch 262–2 was opened by energization of relay coil 2620.

The resulting energization of relay coils 2560 causes it to open its brake switch 256–1 and close its clutch switch 256–2, so that the winding of friction clutch 67–2 is energized at relatively low voltage through closed switch 341–2 and the voltage regulator 344 to engage the clutch lightly. Consequently, drive of the chain conveyor 59–159 begins so as to drag the tripping lug 66–1 from beneath the trigger 136 of the limit switch 135 (see FIG. 1) to permit the limit switch 135–1 to close and the limit switch 135–2 to open. Thus energization of the relay coil 2560 is continued through the holding circuit now closed at switch 135–1 although supply of energy thereto was discontinued through the conductor 104 by virtue of the simultaneous opening of the limit switch 135–2. Continued drive of the chain conveyor [59–59] *59–159* is thus established so as to carry forward the transverse flight bar 64–1 to follow up behind the advancing carton 134, finally to attain the conditions illustrated in FIG. 15.

As is indicated in FIG. 15 carton 134 was delivered to the flap folding station Y and held stopped by the raised stop gate 225. The chain conveyor 59–159 was coasted forward under low driving power to bring the following flight bar 64–1 up to abutment of the trailing or back end of the carton as it is held stopped at the flap folding station Y. Consequently, the flight bar 64–1, by being abutted against the back end of the pausing carton, is located for effecting substantially instantaneous pick-up when the chain conveyor 59–159 is permitted again to travel forward. The clutch continues to be engaged by energization of the relay coil 2560, but under low power applied through switch 341–2 and voltage reducing regulator 344, so that the following flight bar 64–1 engaged the back end of the carton held stopped by the lifted stop gate 225 with relatively light pressure to avoid crushing of the carton. Since the clutch 67–2 is of the friction type it permits slippage when engaged under low power and this continues until the stop gate 225 is retracted a short time thereafter following completion of a flap folding operation.

As the carton 134 was delivered to this flap folding station Y by conveyor belt 27 it interrupted the beam of light emanating from the light source 141 to block off impingement thereof on the second photocell 140, so as to discontinue its excitation for effecting closure of its normally open photoswitch 140–1 and opening of its normally closed photoswitch 140–2. The closure of the photoswitch 140–1 now effects energization of solenoid valve 194 so that it is energized while the energization of the solenoid valve 195 is continued to obtain the condition of FIG. 9. As a result, the retracted clamping rails 80 and 180 are driven inwardly to opposite sides of the carton as it is stopped under the conditions of FIG. 15 at the flap folding station Y. Full clamping pressure is applied to opposite sides of the stopped carton 134 through the raised shoes 211 carried by the inwardly positioned clamping rails 80 and 180.

This closure of the photoswitch 140–1 also effected energization of the Down relay coil 2540 through the closed limit switch 235–1 and the held closed head switch 149–2. Thus the down switches 254 of the elevating motor 174 are closed to cause the flap folding head 2 to be lowered to the open top of the pausing carton 134. As a result, the upstanding front flap of the carton 134 at the flap folding station Y is folded back and down upon the open top of the carton by engagement of the pivoted depending front flap folding arm 146 as it is lowered with the head. During this folding action the front flap folding arm 146 is pivoted up counterclockwise to the horizontal broken line position shown in FIG. 1, so as to permit the biased switch operating arm 148 to be released and effect manipulation of the head switch 149. The release of the head switch 149 permits its held closed switch 149–2 to open so as to discontinue energization of the Down relay coil 2540 to stop the lowering action of the head 2. This manipulation of head switch assembly 149 also permitted closure of its head switches 149–1 and 149–3 and allowed the head switch 149–4 to open. The resulting de-energization of solenoid valve 195 causes retraction of the raised stop gate 225 so as to free the carton 134 for further forward transport by the chain conveyor 59–159, by the action illustrated in the lower portion of FIG. 10.

The simultaneous closure of the head switch 149–1 caused relay coil 3410 to be energized through conductor 101 so that this relay coil closes its switches 341–1 and 341–3 and opens its switch 341–2. Thus, the low power switch 341–2 is opened and full power is applied to the winding of clutch 67–2 through the closed switches 341–3 and 256–2 so that with the maintenance of energization of relay coil 2560 through the closed holding limit switch 135–1 the carton 134 with its front flap folded back and down is instantaneously picked up by the abutting flight bar 64–1 of the released chain conveyor 59–159 for transport forward beneath the tape applying mechanism carried by the lowered beam A to the discharge end 8 of the machine. The retraction of stop gate 225 effected this release of the chain conveyor 59–159. With head switch 149–1 remaining closed the energization of relay coil 3410 is maintained throughout this period to keep its switch 341–3 closed with continuance of the open position of its switch 341–2 so that the carton is carried forward toward discharge under fully applied clutch power.

As was previously indicated when the clamping rails were driven inwardly toward each other to opposite sides of the carton 134 pausing at the flap folding station Y the switch manipulating arm 129 was retracted to hold open the sensing switch 128 (in the bottom parallel circuit of FIG. 16). Thus, although the head switch 149–3 was permitted to close upon lowering of the head down to the open top of the carton at the flap folding station Y the solenoid valve 198 remained de-energized to hold the back flap kicker 161 up in its full line cocked position shown in FIG. 1. When the carton was freed by the retraction of the stop gate 225 and the chain conveyor 59–159 thus was permitted again to travel forward so that its following flight bar 64–1 withdrew the carton therefrom for further forward transport, this partially closed carton soon was carried beyond the retracted switch operating arm 129 to free it and again permit the sensing switch 128 to close. Thus, the back flap kicker valve 198 became energized through closed sensing switch 128 and closed head switch 149–3 to cause the kicker 161 to be swung down and forward sharply, so as to fold forward the upstanding back flap and down upon the partially open top of the forwardly traveling carton for maintenance of the folded conditions of the front and back flaps by forward drag beneath the pressure plate 150, the horizontal face 146–1 of the upwardly swung front flap folding arm 146 and the horizontal bottom face 173–2 of the downwardly swung kicker 161, so as to permit the side flaps to be folded thereover by the plows 233 and then tape to be applied by the tape applying mechanism carried by beam A.

It will be seen from FIG. 15 that the front end of trip lug 166–1 carried by conveyor chain 159 is located only a slight distance behind the depending trigger 236 of the far limit switch 235. Shortly after the partially closed carton 134 was released at the flap folding station Y, by retraction of the stop gate 225 for further transport forward by the now released chain conveyor 59–159 and its flight bar 64–1 abutting the back side of the carton, trip lug 166–1, carried by the conveyor chain 159, engages beneath the trigger 236 and trips it up to manipulate the limit switch 235. This tripping of the limit switch 235 caused its switches 235–1 and 235–2 to open and to be held open while this long tripping lug is traveling forward beneath this switch trigger. As a result, solenoid valve 194 is de-energized by opening of the limit switch 235–1 and the de-energization of the solenoid valve 195 is continued so that their simultaneous de-energization obtains the condition illustrated in FIG. 10, to cause light biasing force to be applied to the inwardly positioned clamping rails 80 and 180 for conversion to guide rails which apply light pressure to opposite sides of the forwardly traveling carton. As is illustrated in FIG. 10, the retraction of the stop gate 225 is maintained.

Before the trailing end of the long tripping lug 166–1 is drawn forward from beneath the limit switch trigger 236 to permit the limit switches 235–1 and 235–2 again to close, the partially closed carton 134 is carried forward beyond the photocell 140 and the light source 141 to permit the beam of light emanating from the latter to impinge upon the former so as to re-excite this photocell. As a result, photocell switch 140–1 is agained opened to maintain the de-energization of solenoid valve 194 after the trailing end of the long tripping lug 166–1 is dragged from beneath the limit switch trigger 236 so as to effect reclosure of the limit switches 235–1 and 235–2. With this opening of the photoswitch 140–1 the companion photoswitch 140–2 recloses the circuit to the Up relay coil 2530, so as to cause the latter to close the bank of switches 253 of the elevating motor 174 for reversing the operation of the latter to elevate the head 2 back up to its initial position. The front flap folder 146 is permitted ultimately to swing down again to depend for reconditioning the head switch 149. The attendant reclosing of the head switches 149–2 and 149–4 conditions the circuits of the Down relay coil 2540 and the solenoid coil 195 for ultimate re-energization thereof, and the attendant opening of the head switches 149–1 and 149–3 respectively de-energizes relay coil 3410 and solenoid valve 198. The de-energizing of relay coil 3410 again permits opening of its switches 341–1 and 341–3 and effects closure of its switch 341–2 to recondition the circuitry of the clutch 67–2 for low power operation. The opening of the head switch 149–3 to cause de-energization of the back flap kicker solenoid valve 198 causes recocking of this kicker from the broken line position shown in FIG. 1 back up to the full line position shown therein.

As the partially closed carton 134 was carried forward by flight bar 64–1 of chain conveyor 59–159 from the flap folding station Y this flight bar dragged up over oblique top edge 216 and web 217 of each of the spring-biased and pivoted clamping shoes 211 temporarily to depress their high forward ends 223 so as to permit free passage of this flight bar, as was explained with reference to FIG. 5. Thereafter, these forward ends 223 of the clamping shoes 211 were permitted to be raised by their biasing springs 222 back up to their efficient carton clamping positions for clamping securely the next oncoming carton 234 at the flap folding station Y.

As the forward travel of the chain conveyor 59–159 drags the trailing end of the long tripping lug 166–1 from beneath the trigger 236 of the far limit switch 235, switches 235–1 and 235–2 are permitted to reclose so that solenoid valve 195 will be re-energized through closed limit switch 235–1 to obtain the condition illustrated in FIG. 11. Consequently, the guiding rails 80 and 180 are retracted to their carton receptive positions and the stop gate 225 is again raised. With continued drive of the chain conveyor 59–159 ultimately the next short lug 66–2 on the near conveyor chain 59 is dragged to beneath the trigger 136 of the limit switch assembly 135 to open its switch 135–1 and discontinue the energization of relay coil 2560, and also to close its switch 135–2.

De-energization of relay coil 2660 is accomplished at the proper time to permit its switch 266–1 to reclose for re-energizing selector entrance gate solenoid valve 197 temporarily, so as to retract momentarily the entrance gate 12 for permitting entry of the next oncoming carton, before the limit switch 235–2 is permitted to reclose by the forward travel of the long tripping lug 166–1 from beneath limit switch trigger 236. When the head switch 149–1 was closed by lowering of the flap folding head 2 to the open top of the carton 134 at the flap folding station Y, effected by upward swing of the front flap folding arm 146 as it was brought down to folding contact of the upwardly extending front flap, to effect energization of the power shifting relay coil 3410, this head switch also performed another important function. The resulting energization of the relay coil 3410, in effecting the shift from a condition dictating relatively low power energization of the clutch 67–2 to full power energization thereof, closes its switch 34–1, as was previously pointed out. A holding shunt circuit is thus established through temporarily closed head switch 149–1, conductor 101, now closed switch 341–1, conductor 104, normally closed photoswitch 138–2 and relay coil 2660. In the absence of such shunt holding circuit the supply of energy to the relay coil 2660 through its closed switch 266–2 and closed limit switch 235–2 would be discontinued when the latter was opened by ultimate chain conveyor travel. As was pointed out this occurs shortly after the release of the powered chain conveyor section 59–159 which is effected by retraction of the stop gate 225 at the flat folding station Y to permit the partially closed carton 134 at this flap folding station to be moved forward by the urging of the flight bar 64–1 pressing against its back end, as will be understood from FIG. 15. The closing of switch 266–1, attendant upon such early de-energization of relay coil 2660, would cause re-energization of the entrance gate solenoid valve 197 to effect retraction of this gate for permitting entrance of the succeeding carton 234 while the preceding carton 134 was being withdrawn from the flap folding station Y and before the solenoid valve 195 could be re-energized by reclosure of head switch 149–4 and limit switch 235–1 to raise the stop gate 225 at the flap folding station into the path of this next oncoming carton. With continued energization of the relay coil 2660 assured by such shunt holding circuit upon the closure of the head switch 149–1 the continued de-energization of the entrance gate solenoid valve 197 is assured until such time as the head switch 149–4 can be reclosed as switch 149–1 is opened, which may be effected by drop of the front flap folding arm 146 in the absence of means to hold switches 149–1 and 149–3 closed and switches 149–2 and 149–4 open for a longer period of time, and the limit switches 235–1 and 235–2 can be reclosed by drag of the long tripping lug (either 266–1 or 266–2 as the case may be) from beneath trigger 236 of limit switch assembly 235, so as to raise the stop gate 225 into the path of the next oncoming carton. This continued energization of the relay coil 2660 is maintained by the maintenance of the closure of the head switch 149–1 until the closing operations performed on the advancing carton 134 are completed, and is then opened before the limit switch 235–2 recloses so that the latter will not continue energization of this relay coil to maintain indefinitely the open position of switch 266–1 and attendant elevation of the entrance gate 12 to prevent entrance of a succeeding carton. When the limit switch 235–2 then recloses very shortly after opening of the head switch 149–1 the simultaneous closure of the limit switch 235–1 effects the properly timed energization of the Up relay coil 2530 to raise the head 2, and the reclosure of the head switch 149–4 simultaneously with the opening of the head switch 149–1 permits this closure of limit switch 235–1 to energize the rail traverse and stop gate lifting solenoid valve 195 for retracting the rails 80 and 180 to their carton-receptive positions and to bar the path of the next oncoming carton at the flap folding station Y.

The circuitry of the machine is thus reconditioned for recycling with the next supplied carton 234 which has been held waiting at the position Z by the raised entrance gate 12 for succeeding entry into the machine until the closing operations performed on carton 134 are completed and it is ready to be cleared from the machine. The drive of the chain conveyor 59–159 section was continued until it was brought to a stop by drag of its tripping lug 62–2 beneath limit switch trigger 136. This reconditioned circuitry is that illustrated in FIG. 16 except that the manual switch 259 remains closed to maintain energization of relay coil 2660 for holding its switches 262–1, 262–3 and 262–5 closed and its switches 262–2 and 262–4 open, and relay coil 2520 remains energized to hold its main motor switches 252 and holding switch 252–4 closed to keep the machine powered and the conveyor belt section 27 running. With entry of the next carton over the momentarily retracted gate 12 the above operations are repeated.

In order to assure the above sequence and timing of the operations of the parts of the machine with respect to a single carton substantially through the machine before the next supplied carton is permitted entry to the conveyor means thereof means are provided to maintain the closure of head switches 149–1 and 149–3 and the open condition of head switches 149–2 and 149–4 until this single carton is transported by the chain conveyor 59–159 from the station Y to a point forward of the tape applying mechanism (when provided), such as that supported on head beam A. It may be preferred to employ for this purpose that which has been provided in the embodiment of the machine being used commercially, described hereinafter.

This function of maintaining the head switches 149–1 and 149–3 closed and the head switches 149–2 and 149–4 open until any certain carton, after being closed by flap folding means carried by elevating head 2, has cleared the tape applying mechanism carried by head beam A (if provided) by means other than such holding switch means. For example, mechanical latch means may be provided to hold during this period the front flap folding arm 146 up in its horizontal position shown in broken lines in FIG. 1. Such mechanical latch means may be a variation of that shown in FIGS. 5, 6 and 7 of our parent application Ser. No. 219,212, in a form automatically to engage and hold the flap folding arm 146 when swung up to its horizontal position as it infolds the front flap and then to release this arm after the closed carton has been transported forward toward the machine discharge end beyond the head supported equipment, such as the tape applying mechanism. For this purpose the depending head post 144 may support an electrical solenoid having a winding in which is reciprocatively mounted a laterally-extending plunger core carrying a latch head extending toward strike means on flap folding arm 146 and spring-biased forward to latched position. Such strike means may be in the form of a latch plate carried by the flap folding arm 146 beneath an opposed edge of which the latch head of the plunger core will engage when the solenoid is deenergized and this core is thrust outwardly by its biasing spring means.

It will be seen from FIG. 17 that the front flap folding arm 146 may, for this purpose, be bifurcated or in the form of a fork between the [furcation] *furcations* of which is located the lateral and forwardly-extending plate 150 supported upon a body 150–1 carried by the lower end of depending head post 144. The body 150–1 is equipped with a solenoid having a winding 152 in which is reciprocatively mounted a plunger core having a latch head 153 and spring biased forward to latch position by a compression spring 155. One of the furcations of the front flap folding arm structure 146 carries a latch plate 154 beneath the inside edge of which the latch head 153 will engage when the solenoid plunger is biased outwardly by its compression spring 155. The winding 152 of this plunger solenoid has one end connected to the neutral line N of the FIG. 16 circuitry by conductor 347 and its other end connected by conductor 346 through a normally open switch 348 to supply line L3 of that circuitry. Pivoted contact arm 349 of this switch is provided with an upstanding trigger 350 to be located in the path of an oncoming closed carton after it has been delivered from between the terminal forward ends of the guide rails 80 and 180 and from beneath the head beam A which carries the top tape applying mechanism, such as, for example, in the near vicinity of the discharge end of the machine. Switch 348 may thus be supported on the underside of one of carton glide plates with its carton-engaging trigger 350 extending up through a clearance hole 351 in this plate indicated in FIG. 3 as to location by way of example. When the closed oncoming carton, in its approach to the discharge end of the machine, strikes the switch trigger 350 to close the switch 348 the solenoid winding 152 will be energized to retract the plunger latch head 153 from beneath the latch plate 154, so as to free the horizontal front flap folding arm structure 146 and permit it to swing down from its broken line position to its full line position shown in FIG. 1. The resulting manipulation of the head switch trigger 148 permits opening of head switch 149–1 with simultaneous closure of head switch 149–4 respectively to de-energize relay coil 3410 for shifting the engagement of clutch 67–2 from high power to low power and to permit re-energization of the rail traverse and carton stop solenoid valve 195. This opening of the head switch 149–1 is to occur prior to reclosure of limit switch 235–2 so as to de-energize relay coil 2660 for allowing closure of its switch 266–1 to effect re-energization of selector entrance gate operating solenoid value 197 upon the following closure of this limit switch.

In the event that the next supplied or succeeding carton, such as that indicated at 234 in FIG. 14, may not be in position Z ready to be delivered past the entrance gate 12 at the time the chain conveyor 59–159 is stopped by opening of limit switch 135–1 as the next chain lug (such as 66–2) trips limit switch 135 to hold the latter in tripped position, so as to hold the next oncoming chain conveyor flight bar (such as 64–2) back in the required position relative to this next entering carton, i.e., behind the latter, as such carton is delivered to its initially critical position upon the rear end of the constantly driven conveyor belt section 27 between the exciting light source 139 and photocell 138 to de-excite the latter, the de-energization of relay coil 2560 (caused by opening of limit switch 135–1) is continued. As a result, clutch switch 256–2 remains open to continue the de-energization of the winding of clutch 67–2 and brake switch 256–1 remains closed for continued energization of the winding of brake 67–1 to maintain application of braking power thereby to the chain conveyor 59–159 so as to hold the latter stopped until this succeeding carton is delivered forward to such initially critical position for forward belt transport toward the flap folding station Y and the separate carton stopping means in the form of the lifted stop gate 225. When the next succeeding carton is delivered after such delay the chain conveyor 59–159 will be started and driven by release of the brake 67–1 and light engagement of clutch 67–2 under low voltage, as previously explained, to coast its oncoming flight bar (64–1 or 64–2 as the case may be) up to the rear end of this carton as the latter is stopped at the flap folding station Y by the raised stop gate 225 in the manner previously described.

It will be noted that the shifting of the drive of the chain conveyor section 59–159 to relatively low power action follows an interval of pause or stop of this conveyor section dictated by trip of limit switch 135 by either of the chain lugs 66–1 and 66–2. Also, it is to be noted that this shifting is dictated by the optical sensing control comprising the photocell 138 and its exciting light source 139 just beyond the entrance gate 12 and by its photoswitch 138–1 with its other switch 138–2 dictating delay of effective control thereby until each entering carton has cleared such optical sensing device by forward chain conveyor transport. The drive of the chain conveyor section under the conditions dictated by the relatively low power action are then maintained by the closure of the shunt limit switch 135–1 when the conveyor tripping lug (either 66–1 or 66–2) is dragged from beneath limit switch trigger 136 upon release of the partially closed carton at the flap folding station Y by retraction of the stop gate 225. Further, it has been shown that the shift from relatively low power action to relatively high power action takes place by closure of the head switch 149–1 upon folding down the carton front flap to energize relay coil 3410 and cause it to close the full power switch 341–3 with simultaneous opening of the low power switch 341–2 as the stop gate is retracted by simultaneous opening of head switch 149–4. This full power drive of the chain conveyor section 59–159 is continued at least until the closed carton is transported forward thereby from beneath the lowered flap folding and tape applying head 2 for discharge from the machine. The second optical sensing means, comprising photocell 140, its exciting light source 141 and photoswitches 140–1 and 140–2 at the flap folding station, has a bearing on the effective actuation of the head switch 149–1 and thus through the latter the shifting of the low power action to the high power action. Only when the Down relay coil 2540 is energized is lowering of the head 2 dictated and this energization is effected only upon closure of the photoswitch 140–1 upon de-excitation of the photocell 140 by cutting off its exciting beam with the presence of a carton stopped at the flap folding station Y. The attendant energization of rail traverse solenoid valve 194 while previously energized rail traverse solenoid valve 195 remains energized effects drive of the clamping rails 80 and 180 inwardly to their carton clamping positions and they are to remain in these relatively inward positions to serve as guides until this carton is discharged from the machine. Thus the limit switch 235–1 is tripped open by long tripping lug 166–1 carried by conveyor chain 159 while the partially closed carton is being withdrawn from the flap folding station Y and then held open by this traveling long tripping lug to keep the Up relay coil 2530 de-energized, and to de-energize both rail traverse valves 194 and 195 for conversion of the clamping rails 80 and 180 to lightly biased guides and keep them in this condition until closed carton discharge before re-energizing solenoid valve 195 by reclosure of limit switch 235–1 to effect retraction of these guiding rails. Since the driving action of the chain conveyor section 59–159 is shifted back to a condition for attaining the low power driving action upon freeing of the front flap folding arm 146 and its resulting swing down to its depending full line position of FIG. 1 this is obtained by the time the chain 59 of the driven chain conveyor section carries its next tripping lug 66–2 to beneath limit switch trigger 136 to trip open holding switch 135–1 of limit switch 135 for repeat operation with the next oncoming carton.

While the sensing controls at the entrance gate 12 and flap folding station Y are of the optical type, as embodied in the photocell systems 1380 and 1400, it is to be understood that either or both may be of a physical type, such as is sensing switch 128 and its operating feeling arm 129 to effect response by contact with carton structure.

In order to make possible improved operation of the box closing machine described above in connection with the embodiment shown in FIGS. 1 to 16 incl. the machine has been improved as to pneumatic and electrical circuitry so as to permit unusual speeds of box closing production and a greater efficiency and better assurance of attainment of desired operational functions. The electrical circuitry of the present commercial box closing machine employs that of the upper half of FIG. 16 down to the first parallel circuit in which the Random switch 259 is embodied. The parallel circuits of the improved electrical circuitry, including the top one in which the switch 259 is embodied are schematically illustrated in FIG. 18. A description of the parts embodied in these parallel circuits, and the functions and the timing relations of the latter will appear hereinafter in connection with the description of a typical operation of such commercial embodiment.

As to the schematic arrangement of the pneumatic system shown in FIGS. 9, 10 and 11 for embodiment in the present box closing machine some minor flow connection changes were made. These changes consisted of disconnecting the low pressure conduit 320 from the orifice 314 of solenoid valve 194 and connecting it over to the orifice 316 thereof; and a reversal of the connections of the rail driving cylinder 301 to this solenoid valve so that the cylinder back end 302 has its input orifice 324 connected to the valve output orifice 313 and its input orifice 325 of its head end 304 connected to valve output orifice 312. Also the flow paths of solenoid valve 194 shown in the upper half of FIG. 9 will be those of this valve when it is de-energized rather than energized. Additionally, the location of the relatively high pressure regulator 318 is removed from the supply line 317 and inserted in the interconnecting conduit 319 at the point 318a, so as to permit the full pressure of the source 306 to be supplied to the stop gate operating cylinder 227 while the relatively high pressure air through the regulator 318, such as forty-five pounds per square inch (45 lbs./sq. in.), is supplied through the solenoid valve 194 to the rail operating cylinder 301.

If the pressurized air of source 306 is then supplied to this changed pneumatic system before power is supplied to the electrical circuitry including the upper half of FIG. 16 and the parallel circuits of FIG. 18 both solenoid valves 194 and 195 will be de-energized. Thus the full pressure of the source 306 will be supplied through conduit 317 to inlet orifice 310 of de-energized solenoid valve 195, thence through internal duct 335 to outlet orifice 307 of this valve and, by way of conduit 333, fed to the front end 231 of the stop gate operating cylinder 227 to retract its piston 229 for lowering or retracting the stop gate 225 out of the carbon path. The back end 228 of the stop gate operating cylinder 227 will be connected by conduit 332 and a lower portion of conduit 319 to orifice 308 of de-energized solenoid valve 195 and thence by way of cross-connection 331 to venting port 311. The upper portion of conduit 319, in which is inserted the relatively high pressure regulator 318, has a common connection with conduit 332 and orifice 308 of solenoid valve 195 and is connected to input orifice 315 of de-energized solenoid valve 194. By virtue of the de-energization of solenoid valve 194 input orifice 315 thereof is cross-connected by internal duct 327 to output orifice 312, which, in turn, is connected to input orifice 325 of the rail driving cylinder 301. The low pressure conduit 320, in which is inserted the relatively low pressure regulator 321, which may be set to feed pressurized air at five to ten pounds per square inch (5–10 lbs./sq. in.), is connected to orifice 316 of de-energized solenoid valve 194 and, by way of internal duct 328, output orifice 313 and conduit 322 is connected to the input orifice 324 of the end 302 of rail driving cylinder 301. As a consequence, air at the pressure of the source 306 is supplied to the front end of the stop gate operating cylinder 227 to retract the piston 229 therein and lower this gate, the back end of this cylinder being vented through orifice 311. Since there will be no flow through de-energized solenoid valve 194 during such operation solenoid valve 195 may be termed the "stop paddle" solenoid valve, and the other solenoid valve 194 may be termed the "rail operating" solenoid valve.

Upon initial closure of the Random switch 259 and the "Run" push button switch 263 the relay coil 2520 is energized for closing the holding switch 252–4. Also the relay coil 2620 is energized to cause it to effect closure of its gang of switches 262–1 (in the upper portion of the FIG. 16 circuitry), 262–2, 262–3 and 262–4, as will be seen from FIG. 18. As a result, a circuit is established for energizing stop paddle solenoid valve 195 which includes in series therewith closed switches 265, 252–4, 262–4, 296–2 and 235–1. The rail operating solenoid valve 194 is connected through this series of switches, closed conveyor switch 435–1 and open photocellswitch 140–1 across the same energizing circuit. While stop paddle solenoid valve 195 is thus energized when power is supplied to the electrical circuitry the rail operating solenoid valve 194 remains de-energized due to the open condition of the photocell switch 140–1.

Figure 7:
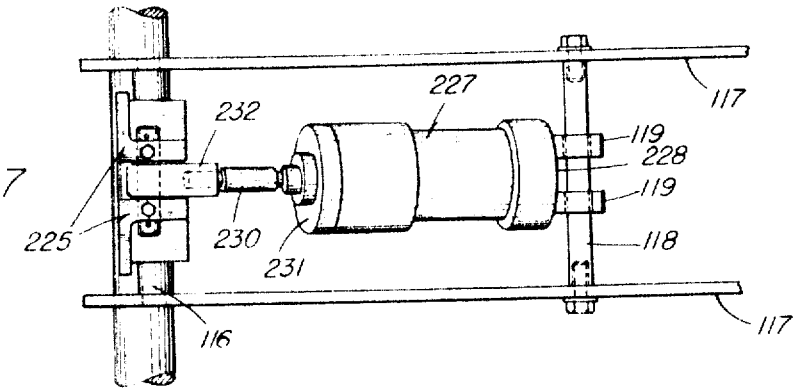
FIG. 7 is a top plan view to larger scale of carton stop gate means shown in FIG. 2, with parts broken away.
Figure 8:
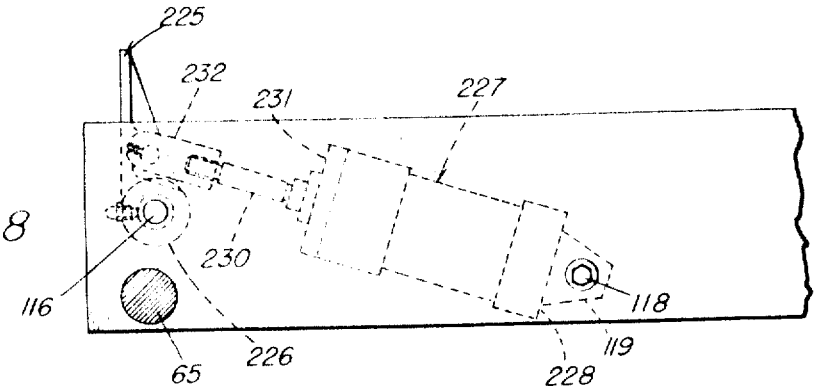
FIG. 8 is a side elevational view of the structure shown in FIG. 7.

While the relocation of the relatively high pressure solenoid valve 318 to the point 318a is not essential it is desired since the pressurized air source 306 can be at a much higher pressure than that required for supply to the rail operating cylinder 301 and thus, if the stop gate 225 is in the form of the pivoted stop paddle illustrated in FIGS. 1, 7 and 8, the air at the higher pressure of the source may be desirably fed to the stop gate operating cylinder 227 in order to assure that it will not be retracted by a heavily loaded oncoming carton as it is delivered to the flap folding station Y. The switch 435–1 is embodied in a trip switch unit of the type illustrated at 235 in FIGS. 14 and 15 and will be located on the far side ledge 11 for trip operation by the long chain lugs 166–1 and 166–2 with its location being in the vicinity of the point 435 indicated in FIG. 3, i.e., near the discharge end 8 of the machine.

With the stop paddle solenoid valve 195 initially energized and the rail operating solenoid valve 194 initially de-energized the high pressure air of the source 306 will be supplied through conduit 317, inlet orifice 310, internal duct 326 and outlet orifice 308 of solenoid valve 195, and conduit [connetcions] *connections* 319 and 332 to the back end of stop gate operating cylinder 227, so as to force the piston 229 therein forward and lift this stop gate to the Up position of FIG. 9. The front end 231 of this cylinder 227 is vented by way of conduit 333, orifice 307, internal duct 334 and orifice 309 to atmosphere. At the same time, the relatively high pressure, such as at forty-five pounds per square inch (45 lbs./sq. in.), is supplied to the inlet orifice 315 of the rail operating solenoid valve 194, thence through its internal duct 327, orifice 312 and conduit 323 to the input orifice 325 of rail driving cylinder 301, so as to supply the pressurized air at forty-five pounds per square inch (45 lbs./sq. in.) ahead of the piston 88 in the latter for holding the widely separated rails 80 and 180 apart in their catron-receptive positions, so as to permit an oncoming carton fed over the retracted entrance gate 12 to enter therebetween. The force which biases these separated clamping rails 80 and 180 apart is the resultant of the relatively high pressure forty-five pounds per square inch (45 lbs./sq. in.) and the opposed relatively low pressure, such as five pounds per square inch (5 lbs./sq. in.), since the latter is supplied simultaneously through conduit 320 to the input orifice 316 of the rail operating solenoid valve 194, and thence through its internal duct 328, output orifice 313, conduit 322, and cylinder input orifice 324 to the opposite side of the piston 88.

Thereafter, when the rail operating solenoid valve 194 is energized, in the [maner] *manner* explained hereinafter, so that both solenoid valves 194 and 195 are simultaneously energized, the stop gate 225 will remain biased upwardly in its carton intercepting position. The relatively high pressure air at forty-five pounds per square inch (45 lbs./sq. in.) will be supplied through energized solenoid valve 195 in input orifice 315 of now energized solenoid valve 194, and thence through internal duct 330 and output orifice 313 of the latter to conduit 322 for supply through cylinder input orifice 324 behind the piston 88 to cause it to be driven forward for driving the clamping rails 80 and 180 inward toward each other to opposite sides of the carton at the flap folding station Y. Simultaneously the opposite side of the piston 88 is vented through cylinder orifice 325, conduit 323, rail operating valve orifice 312, internal duct 329 of the latter and out through its venting orifice 314. Thus the carton which is supplied by the constantly driven initial belt section 27 of the conveyor means to abutment of the lifted stop gate 225 for stop at the flap folding station Y, there to cut off the beam of light emanating from the source 141 that otherwise impinges upon the photocell 140 to cause closure of the photoswitch 140–1, is there clamped between the inwardly driven clamping rails 80 and 180 which are held firmly abutted against its opposite sides.

Ultimately, both solenoid valves 195 and 194 will then be de-energized by opening of the closed switch 296–2 (after photoswitch 140–1 is closed) so as to reverse the connections through these valves. As a consequence, the full pressure of the air source 306 is supplied by conduit 317 through input orifice 310 of solenoid valve 195, its internal duct 335 and output orifice 307, and thence by way of conduit 333 to the front end 231 of stop gate operating cylinder 227, so as to retract the piston 229 in the latter and lower the gate 225. At this same time the back end of cylinder 227 is vented by conduit 32, the lower portion of conduit 319, thence through orifice 308 of solenoid valve 195, its internal duct 331 and orifice 311 to atmosphere. Simultaneously, the relatively low pressure air, such as at five pounds per square inch (5 lbs./sq. in.), is supplied by conduit 320 through orifice 316 of solenoid valve 194, its internal duct 328 and orifice 313, and thence through conduit 322 to input orifice 324 of the rail operating cylinder 301, so as to bias the inwardly positioned clamping rails 80 and 180 lightly against opposite sides conveyor operated switch 235–1, which is biased toward closed position, is opened before the opened switch 296–2 is closed again, so as to maintain temporarily the deenergized conditions of both solenoid valves 194 and 195. Thereafter switch 296–2 is closed as the closed carton clears the flap folding station Y while chain conveyor operated switch 235–1 is held open and chain conveyor operated switch 435–1 is opened before closure of photoswitch 140–1 by arrival of the next carton at the flap folding station so that upon reclosure of switch 235–1 the solenoid valve 195 will re-energized while the circuit of solenoid valve 194 is held open so as to maintain the de-energization of solenoid valve 194. This latter conditioning of the two solenoid valves 195 and 194 is described above as effecting lift of the stop gate 225 to its carton-barring position, so as to check the travel of the next oncoming carton at the flap folding station while the clamping rails are urged out to and held in their open retracted positions with a resultant force of, for example, forty pounds per square inch (40 lbs./sq. in.).

While the top half portion of FIG. 16 when combined with the parallel circuitry of FIG. 18, as proposed above, and the showing in FIG. 1 teach for successively lowering and elevating of the flap folding head 2 by electrical means, including reversible motor 174 and its reversing switch equipments 253 and 254 under the control of relays 2530 and 2540, some embodiments of the present commercial machine are equipped with a pneumatic elevating system in lieu of that electrical equipment in which solenoid valves are substituted for relays 2530 and 2540. Such improved pneumatic elevating mechanism permits omission of the lowering or Down limit switch 186–1, but the raising of Up elevating limit switch 186–2 is retained for two purposes. One purpose is to permit vertical manual adjustment of the top stop collar 193 which dictates trip of the switch unit 186 to manipulate switches 186–1 and 186–2 thereof so as to adapt the height of elevation of the flap folding head 2 to the maximum size of the particular group of cartons to be fed through the machine in a particular period, so as to avoid unnecessary excessive elevation of the head and thus speed carton handling. The other purpose is to provide a timed control for the raising or Up operation of the elevating head 2, this timed control being effected by the retention of the elevating switch 186–2 which is biased toward closed position and it tripped to and held in open position when the switch trigger 187 engages the top stop 193. Upon lowering of the flap folding head 2 elevating limit switch 186–2 is permitted to close as the switch trigger 187 is lowered away from the stop 193 so as to condition the circuit of the Up relay coil 2530 when the photoswitch 140–2 is closed for energizing this Up relay coil upon closure of its current supplying circuit through closed switches 435–1, 235–1 and 296–2.

Operation of the embodiment of the machine when equipped with the altered pneumatic circuit and the electrical circuitry of FIG. 18.

As will be seen from FIG. 18 the first parallel circuit thereof, extending between power supply line "L3" and the ground line N, consists of a conductor 355 in which is inserted the Uniform-Random switch 259, for closure to handle a group of random size cartons, and relay coil 2620. The second parallel circuit 356 has inserted therein chain conveyor operated switch 235–2 which is biased to closed position, closed relay switch 266–1 and the entrance gate-operating solenoid valve 197. The third parallel circuit 357 extends from a point of connection to circuit 356 between switches 235–2 and 266–1 to the neutral line N and has inserted therein the initially open relay switches 262–2 and 266–2, and relay coil 2660. Parallel circuit 358 constitutes the machine running circuit having therein a closed push button STOP switch in series with a normally open push button RUN switch 263, to be pushed closed for initiating operation of the machine, and relay coil 2520. Parallel circuit 359 is connected to circuit 358 between the STOP and RUN switches and the neutral line "N," having therein in series an overload switch 265, a holding switch 252–4, normally closed sensing switch 128, normally open head switch 149–3, and back flap kicker solenoid valve 198. Circuits 358 and 359 are cross-connected from a point beyond switch 263 to a point between switches 252–4 and 128. A loop circuit 360 has its end legs 361 and 363 connected to the neutral line "N," with leg 361 including open chain conveyor operated switch 135–1 which is biased toward closed position and relay coil 2560. A cross-connection is effected between circuit 357 and loop circuit leg 361 by a conductor 362 having in series therein normally open photoswitch 138–1, normally closed photoswitch 138–2, and closed chain conveyor operated switch 135–4 which is biased toward open position. A bridge 366 is connected across between circuit 357 from a point beyond relay switch 266–2 and conductor 362 at a point between the photocell switches 138–1 and 138–2. The other leg 363 of the loop circuit 360 has in series therein open head switch 149–1 which is biased toward closure, and relay coil 2960. An intermediate leg 364 of loop circuit 360 includes normally open relay switch 296–1 and relay coil 3410. A bridge conductor 365 is shunted around relay switch 296–1 and includes in series open conveyor operated switch 135–3, which is biased toward closed position, and normally open relay switch 341–1. A bridge 367 connects the loop leg 363 to the circuit 359 respectively ahead of the head switch 149–1 in the former and sensing switch 128 in the latter, and includes a normally open relay switch 262–3. Circuit 368 is connected to circuit 359 between switches 252–4 and 128 and neutral line N, and includes therein in series open relay switch 262–4, closed relay switch 296–2, closed chain conveyor operated switch 235–1, which is biased toward closed position, and stop gate operating solenoid valve 195. Circuit 370 is connected by conductor 369 to circuit 368 at a point beyond switch 235–1 through normally closed chain conveyor operated switch 435–1, which is biased to closed position, and includes in series therein open photoswitch 140–1, closed head switch 149–2 which is biased toward open position, closed bottom elevating limit switch 186–1 which is biased to closed position, and Down relay coil 2540. Switches 149–2, 186–1 and relay coil 2540 in circuit 370 are shunted by a bridging conductor 371 which has therein rail operating solenoid valve 194. Parallel circuit 372 is connected through open switches 275 and 273, open top elevating limit switch 186–2 which is biased toward closure, and "Up" relay coil 2530, to neutral line N. A bridge 373 is connected between conductor 369 ahead of photoswitch 140–1 and circuit 372 at a point between switches 273 and 186–2, and includes closed photoswitch 140–2 and closed switch 272 in series.

Conveyor chain operated switches 235–1 and 235–2 are ganged together for simultaneous operation. Relay switches 262–2, 262–3 and 262–4 are ganged together and to switch 262–1 which energizes the photocell units 1380 and 1400 of the top portion of FIG. 16 for simultaneous operation. Relay switches 266–1 and 266–2 are ganged together similarly. Photoswitches 138–1 and 138–2 are ganged together for like purpose. Relay switches 296–1 and 296–2 are ganged together similarly. Conveyor chain operated switches 135–1, 135–3 and 135–4 are ganged together for simultaneous operation. Relay switch 341–1 is ganged together with low power relay switch 341–2 and high power relay switch 241–3 in the top portion of FIG. 16. Head switches 149–1, 149–2 and 149–3 are ganged together for simultaneous operation. Photoswitches 140–1 and 140–2 are ganged together for like purpose. Switches 272, 273 and 275 are provided for manual operation to allow ready release of a carton in the machine which is jammed or damaged. The gang of switches 262 are provided to be left open for Uniform carton operation.

Assume the embodiment of the machine illustrated in FIG. 18 is to be readied for operation by providing a group of successive cartons on the feed conveyor 9 (FIG. 1) and that these [are random] *are of random* sizes. Switch 259 will be closed to Random position so as to energize relay coil 2620 which will then close the gang of switches 262 to supply current through switch 262–2 to circuit 357, close the bridge 367 at switch 262–3 and connect circuit 368 to circuit 359 through the switch 264–2. Momentary closure of push button "RUN" switch 263 will energize relay coil 2520 to close its holding switch 252–4, so as to start and maintain the running of the main drive motor 51 (see top portion of FIG. 16), continuously to run initial conveyor section endless belt 27. Upon supply of power to the FIG. 18 electrical circuitry, entrance gate solenoid valve 197 became energized through closed chain conveyor operated switch 235–2 and closed relay switch 266–1.

Upon such energization of the solenoid valve 197 entrance gate 12 was retracted to permit entrance of the leading carton thereacross to the running endless belt 27. As the entering carton passes the photocell 138 it cuts off the beam of light impinging thereon which emanated from light source 139, to close photoswitch 138–1 and open photoswitch 138–2. The closure of photoswitch 138–1 energizes relay coil 2660 to close its holding switch 266–2 and open its switch 266–1, so as to de-energize the gate retracting solenoid valve 197 at the latter, thereby permitting the entrance gate to rise beneath the entering carton and [providing] *provide* a barring obstruction for the next oncoming carton. Since the relay coil 2560 remains de-energized by the opening of photoswitch 138–2 the brake coil 67–1 (top portion of FIG. 16) remains energized to continue to hold the second conveyor section, consisting of chain conveyor 59–159, undriven. Relay coils 3410 and 2960 remain de-energized (since switches 296–1 and 149–1 are open), while relay coil 2520 remains energized to continue to hold its holding switch 252–4 closed. Back flap kicker solenoid valve 198 remains de-energized since head switch 149–3 is still open and it thus holds the kicker 161 up in the cocked position illustrated in FIG. 1.

Since with the closure of holding switch 252–4 current was supplied through the series of closed switches 262–4, 262–2 and 235–1 to the stop gate solenoid valve 195 to energize it while rail operating solenoid valve 194 remains de-energized because photoswitch 140–1 is still open the stop paddle 225 is raised up into the path of the oncoming carton at the flap folding station Y, as was explained above in connection with the description of the conjoint operation of the solenoid valves 194 and 195. Since the clamping rails 80 and 180 were initially spread apart to their fully separated relation they received therebetween the oncoming carton carried by the continuously driven endless belt 27 to deliver it to the flap folding station Y for abutment against the raised stop gate 225.

As the carton is delivered to the flap folding station Y it interrupts the beam of light emanating from the light source at 141 to discontinue impingement thereof upon photocell 140, so as to close the photoswitch 140–1 and open the photoswitch 140–2. The closure of photoswitch 140–1 supplies current to the Down relay coil 2540 so as to energize it and cause the lowering of the flap folding head 2. As was previously explained, the lowering of the flap folding head 2 causes the front flap folding arm 146 to fold the upstanding front flap down and back upon the open top of the carton, thereby freeing the head switch assembly 149 so as to permit closure of head switches 149–1 and 149–3, and opening of the head switch 149–2 to break the circuit of relay coil 2540 and stop the lowering of the flap folding head 2. The lowering of the head 2 freed its top limit switch 186–2 for closure to ready the energizing circuit of Up ready coil 2530. As the carton traveled forward to the flap folding station Y its far side engaged and retracted the sensing switch operating arm 129 to open sensing switch 128 so that the de-energized condition of the kicker solenoid valve 198 would be maintained upon such closure of the head switch 149–3, thereby continuing the cocked condition of back flap folding kicker 161.

Since rail operating solenoid valve 195 remains energized until relay switch 296–2 is opened and stop paddle solenoid valve 194 is energized upon closing of the photoswitch 140–1 the simultaneous energization thereof maintains the stop paddle 225 up to hold the carton 134 at the flap folding station while the clamping rails 80 and 180 are driven inwardly toward each other by the relatively high pressure of forty-five pounds per square inch (45 lbs./sq. in.) to abut opposite sides of the carton and securely clamp it in the manner described above before the head 2 reaches the bottom of its downward travel to close headswitch 149–1.

Also, as the carton passed beyond photocell 138 it permitted the latter again to be energized by the beam of light emanating from the light source 139 so as again to close photoswitch 138–1 and open photoswitch 138–2. Thus relay coil 2560 becomes energized through closed switches 235–2, 252–2, 266–2, 138–2 and 135–4. This action releases the brake 67–1 and engages the clutch 67–2 (see top portion of FIG. 16) so as to drive the second conveyor section or chain conveyor 59–159 under low power operating condition so as to coast up behind the carton stopped at the flap folding station Y the following transverse conveyor flight 64–1 (see FIGS. 14 and 15). With this low power drive of the chain conveyor 59–159 its lug 66–1 is dragged from beneath trigger 136 of chain conveyor operated switch 135 (see FIG. 1) simultaneously to open switch 135–4 and close switches 135–1 and 135–3. The relay coil 2560 remains energized despite the opening of the switch 135–4 since switch 135–1 is simultaneously closed to complete an energizing circuit through closed switches 265, 252–4, 262–3, bridge 367 and the head portion of circuit loop 360.

There is thus a tendency to continue low power drive of the chain conveyor 59–159, but the abutment of its transverse flight 64–1 to the trailing end of the carton 134 held stopped at the flap folding station Y by the raised stop paddle 225, resists by such abutment this low power drive tendency with consequent stoppage of the chain conveyor. Consequently, the transverse conveyor flight 64–1 remains snugly against the trailing end of the carton 134 while the clutch 67–2 is slipping on low power drive, so as to permit the chain conveyor immediately to pick up this carton and carry it forward on through the machine to discharge as soon as the stop paddle 225 is retracted from in front of this carton. It will also be noted from FIG. 15 that when the low power drive of the chain conveyor 59–159 is stopped in this manner the leading end of long tripping lug 266–1 is located short of the trigger 236 of chain conveyor operated switch 235. Such long lugs 166–1 and 166–2 on the far side chain of this conveyor are to be varied in length with respect to the dimensions of the cartons being handled. For example, if the machine is to accept a group of cartons the maximum length (from front to back ends) of which is twenty inches (20″) the leading end of the long lug 266–1 will terminate approximately at the point 353. And if the maximum length of the cartons is thirty-six inches (36″) the leading end of this long lug will terminate approximately at the point 354 (see FIG. 15). These adjustments of the lengths of the long lugs 166–1 and 166–2 are effected readily at the time the machine is being set up to handle any particular group of cartons, due to a sectioned character of such lug assemblies and ease with which each lug section can be slipped off of chain conveyor 159.

The ultimate closure of head switch 149–1 as the lowering flap folding head 2 is brought down upon the top of the stopped carton 134, resulting from the upward swing of front flap folding arm 146 to free switch assembly 149, effects energization of relay coil 2960 to close its switch 296–1 and open its switch 296–2. Thus solenoid valves 194 and 195 are simultaneously de-energized so as to bias the piston 88 in the rail operating cylinder 301 with relatively low pressure, such as five pounds per square inch (5 lbs./sq. in.), thereby converting the clamping rails to guiding rails with light biasing thereof against opposite sides of the carton to permit the latter to glide forward therebetween upon release from the flap folding station 225. Simultaneously, the de-energization of solenoid valve 195 causes retraction of the stop paddle 225 from in front of the carton 134 to permit the chain conveyor 59–159 to pick it up instantly and transport it forward. The closure of relay switch 296–1 causes energization of the relay coil 3410 to close its holding switch 341–1 and to close the high power switch 341–3 and open the low power switch 341–2 of the brake-clutch system 256 (see the top portion of FIG. 16). The chain conveyor 59–159 is thus driven under full or high power to carry the released carton 134 forward beneath the lowered head 2, and the tape applying mechanism if used, to the front discharge end of the machine. As the carton is carried forward its trailing end drags past the sensing switch operating arm 129 to free it and thus permit closure of the sensing switch 128 in properly timed relation with respect to the forwardly traveling upstanding carton back flap and operation of the cocked back flap kicker 161. Closure of the sensing switch 128 energizes kicker solenoid valve 198 to cause the kicker 161 to strike down against the back side of the upstanding back flap and fold it forward upon the open top of the forwardly moving carton.

As the carton 134 leaves the flap folding station Y under full power drive of chain conveyor 59–159 it discontinues interception of the beam of light emanating from the light source 141, thereby permitting the light beam again to impinge upon the photocell 140, so that the latter effects reopening of the photoswitch 140–1 and circuit-reading reclosing of the photoswitch 140–2. However, Up relay coil 2530 remains de-energized for a time since conveyor operated switch 235–1 in its energizing circuit is opened and continues to be held open by conveyor long lug 166–1 until the latter is dragged from beneath trigger 236 of switch unit 235, this circuit being maintained open for a time thereafter by switch 435. It will be made to appear later that before chain conveyor operated switch 235–1 is permitted to reclose the switch 435–1 is opened by the same long lug 166–1 and not until the latter clears the trigger of switch unit 435 will the Up relay coil 2530 be energized to raise the flap folding head 2.

With forward travel of the chain conveyor 59–159 under full power to withdraw closed carton 134 from the flap folding station Y the leading end of the long tripping lug 166–1 is carried to beneath the operating trigger 236 of switch 235 to open switches 235–1 and 235–2. The opening of the energizing circuit of the Up relay coil 2530 at switch 235–1 before relay switch 296–2 recloses causes the head to remain down in its lowered position until the trailing end of the closed carton is brought forward to beneath the center of the advance pair of tape wipe-on arms C (FIG. 1). In this particular system it is not necessary to hold the entrance gate 12 up in its carton barring position to delay the entrance of the next following carton until the preceding closed carton is discharged from the machine, and thus the operation of the machine can be speeded up for efficient rapid production. An ultimate reclosing of the conveyor chain operated switch 235–2 effects re-energization of the entrance gate retracting solenoid valve 197 to permit the next carton to enter thereover due to the fact that the switch 266–1 was reclosed upon de-energizaion of the relay coil 2660 with the opening of the chain conveyor operated switch 235–2. The reopening of the flap folding head switch 149–3, such as by raising the flap folding head 2 or permitting front flap folding arm 146 to drop behind the closed carton 134 being transported forward from the flap [holding] *folding* station Y, whichever may occur first, effects de-energization of the back flap kicker solenoid valve 198 so as to recock the kicker 161 to the full line position shown in FIG. 1. Since raising of the head 2 is delayed until the closed and taped carton 134 clears the taping mechanism speed-up in handling successive cartons is assured by permitting the front flap folding arm 146 to drop down behind the closed carton as it is cleared from the [flag] *flap* folding station Y, which forces head switches 149–1 and 149–3 to reopen and 149–2 to reclose. Reclosure of head switch 149–2 readies the energizing circuit of Down relay coil 2540 to be reclosed later. Reopening of head switch 149–1 de-energizes relay coil 2690 to reclose its switch 296–2 and reopen its switch 296–1 which would tend to de-energize relay coil 3410 in the absence of an alternate energizing circuit for this relay coil. Such an alternate energizing circuit for high power drive relay coil 3410 is provided through now closed chain conveyor operated switch 135–3 and closed holding switch 341–1, to maintain the energization of this relay coil. With the entrance of the next oncoming carton the attendant closure of the photoswitch 138–1 again re-energizes relay coil 2660 to open its switch 266–1 and de-energize the entrance gate solenoid valve 197 for again lifting the gate 12 to carton barring position with respect to the next supplied carton. Such energization of relay coil 2660 recloses its holding switch 266–2 to maintain energization of the former until chain conveyor switch 235–2 is reopened.

As the trailing end of the long tripping lug 166–1 is dragged from beneath the trigger 236 of chain conveyor operated switch 235, to permit reclosure of its switch 235–1, the stop gate operating solenoid valve 195 becomes energized through now closed switches 296–2 and 235–1, while rail driving solenoid valve 194 remains de-energized due to the open condition of the photoswitch 140–1. With the solenoid valve 195 energized while the de-energization of the solenoid valve 194 is so continued the relatively high pressure of say forty-five pounds per square inch (45 lbs./sq. in.) is supplied to the front end of the rail driving cylinder 301 while the relatively low pressure of say five pounds per square inch (5 lbs./sq. in.) is supplied to the opposite end thereof to impose a resultant retracting pressure of say forty pounds per square inch (40 lbs./sq. inch) ahead of its piston 88, so as to effect the retraction of the guide rails 80 and 180 to their initial carton-receptive positions. At the same time the retracted stop gate 225 is again raised across the path of the next oncoming carton to intercept it at the flap folding station Y there to cause it to stop beneath the flap folding head 2.

The leading end of the long tripping lug 166–1 [trips,] *trips* the trigger of the chain conveyor operated switch unit 435, which is located at the point indicated in FIGS. 14 and 15, so as to open its switch 435–1 before chain conveyor operated switch 235–1 is permitted to reclose, so as to continue de-energization of the Up relay coil 2530 (as well as of the Down relay coil 2540), and also of the operating solenoid valve 194 for raising the stop paddle 225 into the path of the next oncoming carton at the flap folding station Y. Thus the long tripping lug 166–1 is to be of such length as to bridge across from the trigger 236 of the chain conveyor operated switch unit 235 to the trigger of the chain conveyor operated switch unit 435 to hold open simultaneously for a few seconds their switches 235–1 and 435–1. Since the chain conveyor operated switch 435–1 is to control the raising of the flap folding head 2 before the photoswitch 140–2 is opened again by the next oncoming carton arriving at the flap folding station Y, so as to prevent jamming of this next oncoming carton against the lowererd head, and particularly at the moment that the trailing end of the preceding closed and taped carton 134 arrives at a point beneath the forward tape wipe-on arms at C (FIG. 1), the trailing end of the long tripping lug 166–1 must be dragged from beneath the trigger of this switch unit 435 at this time to permit reclosure of the conveyor chain operated switch 435–1 for the energization of the Up relay coil 2530. Thus the chain conveyor long tripping lug 166–1 should be foreshortened on its trailing end in a showing of the type depicted in FIG. 15 for proper operation of this embodiment of the invention. For example, the trailing end of such long tripping lug 166–1 may terminate in the FIG. 15 showing at a point somewhat ahead of the leading end of the carton 134, such as at about that indicated at 375. With the understanding that adjustability of the length of each of the long tripping lugs 166–1 and 166–2, as well as the locations of the chain operated switch units 235 and 435 along the length of the machine bed, may be required so as to adapt the machine to effective operation upon any particular group of cartons to attain the certain required sequence of operations of the switches 296–2, 235–1 and 435–1, one skilled in the art readily can make such adjustments to fit the requirements. In doing so, one must remember that switch 296–2 must first be opened by energization of its operating relay coil 2960, to be effected by the closure of head switch 149–1 as the head 2 is lowered by energization of the Down relay coil 2540 upon the top of the carton held stopped at the flap folding station Y. Also, that then the conveyor chain operated switch 235–1 is to be opened before closure of switch 296–2 by transporting the carton forward beyond the flap folding station Y, so as to continue de-energization of the stop paddle operating solenoid valve 195 for maintaining the carton guiding conditions of the lightly biased rails 80 and 180 until the closed carton clears the head 2. And finally, that the conveyor chain operated switch 435–1 must be opened before the chain operated conveyor switch 235–1 is again closed, with these actions being dictated by the same chain conveyor long tripping lug 166–1 or 166–2 as the case may be, so as to maintain de-energization of the rail driving solenoid valve 194 and the Up head elevating relay coil 2530, for retracting the rails 80 and 180 to their carton-receptive positions and to raise the stop paddle 225 into the path of the next oncoming carton and for raising the flap folding head 2 above this next oncoming carton before it arrives at the flap folding station Y. When this next oncoming carton does arrive at the flap folding station Y to abutment of the raised stop paddle 225, so as to close the photoswitch 140–1 simultaneously with opening of the photoswitch 140–2, with the head switch 149–2 reclosed by drop of the front flap folding arm 146 behind the preceding carton 134 as it is transported forward beyond the flap folding station Y, the Down relay coil 2540 will become energized again upon reclosure of the conveyor chain operated switch 435–1 as the trailing end of the long tripping lug 166–1, or 166–2 as the case may be, clears the trigger of the switch unit 435. Consequently, the flap folding head 2 is lowered to the top of the next succeeding carton which is being held stopped by the raised stop paddle 225 at the flap folding station Y, and the embodiment of the machine which features the electrical circuitry of FIG. 18 is readied for recycling action.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. In an automatic carton closing machine for folding down and inward the upwardly-extending front and rear flaps of a series of successive open-top cartons to closed lateral positions, including those of relatively shallow depths, the combination with (A) lateral conveyor means having an entrance end and a discharge end and defining a path of forward carton travel along which said conveyor means transports each carton, (B) a carton sensing and flap folding station located at a point along said path, (C) a movable front and rear flap folding sub-assembly mounted for motion along a path at an angle to said carton travel path toward and away from the open top of a carton at said station, (D) carton sensing means located along said carton travel path responsive to the presence of an open-top carton at said station to dictate advance of said flap folding means toward the unfolded and upwardly-extending flaps thereof and to fold the front flap back and inward to closing position, (E) carton height control means at said station responsive to the top of said carton to stop the advance of said flap folding sub-assembly upon inward folding of the front flap down upon the carton top, (F) movable rear flap folding means also carried by said flap folding sub-assembly to fold the rear flap forward and inward to closing position, (G) means to cause each open-top carton to pause at said station for permitting advance of said flap folding sub-assembly to the top of said pausing carton and after performance of a flap-folding operation thereon to release said pausing carton from said station for transport by said conveyor means to the discharge end, (H) a pair of opposed, longitudinally-extending, carton clamping and guiding members flanking opposite sides of said station with at least one movable transversely relative to the other for relative approach temporarily to clamp therebetween a carton pausing at said station and for relative retraction to permit reception therebetween of a succeeding carton, and (I) means to drive at least one of said clamping and guiding members transversely for advance thereof toward the other to effect such carton clamping approach and for the relative retraction thereof; of (a) carton side engaging means supported on one of said carton clamping and guiding members at the inner side of the latter to constitute the means of contacting a side of a carton pausing at said station by structure of said member, (b) means movably mounting said carton side engaging means on said member for alternate motion away from the latter and said conveyor means toward said flap folding sub-assembly for appreciable lap against the opposed carton side and retraction toward said member and conveyor means to minimize projection of said carton side engaging means, and (c) means to effect such retraction of said carton side engaging means as said conveyor means picks up the pausing carton at said station and transports it forward.

2. The carton closing machine equipment as defined in claim 1 in which said conveyor means is equipped with a transverse flight to effect such carton pick-up at said station by sweep through the latter past said flap folding sub-assembly with this flight extending toward the latter a minimum distance whereby said flap folding sub-assembly may be located close to said conveyor means at said station for closing operations on cartons of relatively shallow depth, said flight constituting said means to effect the retraction of said carton side engaging means when swept over the latter through said station.

3. The carton closing machine equipment as defined in claim 2 in which each of both of said carton clamping and guiding members is equipped with one of a pair of said carton side engaging means arranged in opposed relation.

4. The carton closing machine equipment as defined in claim 3 in which each of said carton side engaging means is in the form of an elongated shoe pivotally mounted on a transverse axis to the member supporting it and having a free end extending in the direction of travel of cartons along said path from its axis retractably biased outwardly from said member toward said flap folding sub-assembly.

5. The carton closing machine equipment as defined in claim 4 in which said shoe free end is biased outwardly by spring means intervening this end and said member supporting said shoe.

6. The carton closing machine equipment as defined in claim 1 in which said drive means for said clamping and guiding members comprises a double-ended pneumatic motor including a cylinder and piston means reciprocatively mounted in said cylinder, means connecting at least one of said clamping and guiding members to said piston means to cause it to advance toward the other member upon thrust of said piston means in said cylinder in one direction and to retract said member relative to the other upon thrust of said piston means in the opposite direction, a pair of fluid-conducting passages respectively connected to opposite ends of said cylinder on opposite sides of said piston means, sources of relatively low pressure and relatively high pressure gaseous medium, and plural-position valve means provided with multiple passages connected between said gaseous medium sources and said cylinder passages which in one position supplies the relatively high pressure gaseous medium through a first one of said cylinder passages behind said piston means to thrust it forward in member advancing direction, in a second position substitutes the relatively low pressure gaseous medium for the relatively high pressure gaseous medium behind said piston means elastically to bias at relatively low pressure said members to their relative advanced positions against opposite sides of a carton there-between at said station to convert said members to guides for this carton and permit its advance therebetween by said conveyor means beyond said station, and in a third position supplies the relatively high pressure gaseous medium through the second cylinder passage ahead of said piston means to thrust it back in member retracting direction.

7. The carton closing machine equipment as defined in claim 6 in which said valve means in the third position maintains connection between the source of the relatively low pressure gaseous medium and said first cylinder passage for application of this pressure behind said piston means while connection between the source of the relatively high pressure gaseous medium and said second cylinder passage is maintained with application ahead of said piston means of the differential of these pressures as the medium of applying the back thrust.

8. The carton closing machine equipment as defined in claim 7 in which said vlave means comprises a pair of four-way valves each equipped with first and second orifices on the delivery side thereof and third, fourth and fifth orifices on the receiving side thereof, said first delivery side orifice of each valve being alternately connectable by valve-manipulation to said third and fourth receiving side orifices of this valve and said second delivery side orifice thereof being simultaneously alternately connectable by the same valve manipulation to said fourth and fifth receiving side orifices of this valve, said relatively high pressure source of gaseous medium being connected to said fourth receiving side orifice of a first one of said valves with said second delivery side orifice of the latter connected to said fourth receiving side orifice of the second one of said valves and said relatively low pressure source of gaseous medium being connected to said third receiving side orifice of this second valve, said first and second delivery side orifices of said second valve being respectively connected to said first and second cylinder passages of said cylinder, said third and fifth receiving side orifices of said first valve and said fifth receiving side orifice of said second valve constituting vents.

9. The carton closing machine equipment as defined in claim 8 in which said means to cause each carton to pause at said station comprises movable gate means mounted at the exit end of said station and in an initial position located in the path of forward carton travel to intercept a carton traveling along this path to said station, said gate means being withdrawable from said path to permit carton transport by said conveyor means beyond said station, and a second pneumatic motor having piston means retractable by pressurized gaseous medium supplied to a first end of said cylinder, means connecting said piston means of said second pneumatic motor to said gate means to effect withdrawal of the latter from said path upon retraction of said piston means, conduit means connecting said first delivery side orifice of said first valve to said first end of said cylinder of said second pneumatic motor to supply the relatively high pressure gaseous medium behind said piston means of the latter to retract this piston means and said gate means therewith, and means to return said withdrawn gate means to its carton interception initial position as said clamping members are retracted relative to each other for reception therebetween of a succeeding carton.

10. The carton closing machine equipment as defined in claim 9 in which said gate return means comprises conduit means connected between said second delivery side orifice of said first valve and the other end of said second pneumatic motor alternatively to supply the relatively high pressure gaseous medium to the opposite side of said piston means of said second pneumatic motor for return thrust of this piston means.

11. The carton closing machine equipment as defined in claim 6 in which said means to cause each carton to pause at said station comprises movable gate means mounted at the exit end of said station and in an initial position located in the path of forward carton travel to intercept a carton traveling along this path to said station, said gate means being withdrawable from said path to permit carton transport by said conveyor means beyond said station, and a second pneumatic motor having piston means retractable by pressurized gaseous medium supplied to a first end of said cylinder, means connecting said piston means of said second pneumatic motor to said gate means to effect withdrawal of the latter from said path upon retraction of said piston means, conduit means connecting said first end of said cylinder of said second pneumatic motor to said valve means for conduction of the relatively high pressure gaseous medium through the latter in its second position to behind said piston means of this second pneumatic motor to retract said piston means and said gate means therewith, and means to return said withdrawn gate means to its carton interception initial position as said clamping members are retracted relative to each other for reception therebetween of a succeeding carton.

12. The carton closing machine as defined in claim 11 in which said gate return means comprises conduit means connecting the other end of said cylinder of said second pneumatic motor to said valve means for conduction of the relatively high pressure gaseous medium through the latter in its third position to the opposite side of said piston means of said second pneumatic motor for return thrust of this piston means to effect return of said gate means to its carton interception initial position as said clamping members are retracted relative to each other.

13. In an automatic carton closing machine for folding down and inward to closed lateral positions the upwardly-extending front and rear flaps of a series of supplied successive open-top cartons while said cartons are being transported through said machine, the combination with (A) lateral conveyor means having an entrance end and a discharge end and defining a path of forward carton travel from the entrance end along which said conveyor means transports each carton comprising a section provided with a plurality of longitudinally spaced carton pick-up flight means each to be carried up behind a carton as it is delivered into the entrance end for forward carton transport, (B) movable entrance gate means at the entrance end periodically to permit entrance to said conveyor means of a single carton at a time and to hold back temporarily each of the next of the series of supplied open cartons until closing operations are performed on the preceding carton, (C) a carton sensing and flap folding station located at a point along said path forward of the entrance end at which each carton is caused to pause in its forward transport through said machine by said conveyor means, (d) a movable carton flap folding sub-assembly mounted for motion along a path at an angle to said carton travel path toward and away from the open top of a carton pasuing at said station, [and,] *and*

(E) means to drive forward said flight equipped conveyor section periodically; of (a) carton stop means at said station separate from said conveyor means alternately movable to a position of engagement of each oncoming carton transported forward along said path of forward carton travel to hold it stopped temporarily at said station for performance of a flap folding operation thereon and then retractable to free this carton for further forward transport by said conveyor section, (b) means associated with said conveyor driving means alternately to shift the action thereof between a relatively low power type that will carry one of said flight means up behind a carton being delivered beyond said entrance gate means to said station to abutment of the back end of said carton with relatively light pressure thereagainst as said carton is stopped at said station by said stop means to cause stoppage of said conveyor section without carton crushage, and a relatively high power type upon retraction of said stop means, and (c) carton sensing means at said entrance end connected to said drive shifting means to dictate and initiate relatively low power action of said driving means as each carton is delivered therepast toward said station to carry the next flight means up behind this carton.

14. The carton transport equipment as defined in claim 13 in which brake means are associated with said conveyor driving means periodically to apply braking power to the latter to hold said conveyor means stopped in the absence of a carton in said machine, and brake releasing means are provided which are controlled by said carton sensing means to release said brake means as the low power driving action is initiated thereby.

15. The carton transport equipment as defined in claim 14 in which control means are mounted on said movable carton flap folding sub-assembly responsive to said pausing carton as said sub-assembly is advanced to the latter to initiate retraction of said carton stop means at said station and operation of said shifting means to change the drive of said conveyor driving means from the relatively low power action to the relatively high power action.

16. The carton transport equipment as defined in claim 15 in which said driving means is in the form of friction clutch means and said drive shifting means is of a structure alternately to effect application of relatively light engagement pressure between friction driving and driven means of said clutch means for the relatively low power action while permitting relative slippage when said conveyor section is stopped by abutment of its oncoming flight means to the back end of a carton held stopped by said stop means at said flap folding station and then to effect application of greater engagement pressure to attain relatively high power drive of said conveyor section and cause its abutted flight means to pick up said carton at said station when released by retraction of said stop means.

17. The carton transport equipment as defined in claim 16 in which is provided a carton closing head mounted for alternate movement to the open top of a carton at said station and away from the carton top with said head carrying said flap folding sub-assembly and means responding to the presence and absence of a carton top adjacent said head, and in which said driving shifting means is operatively responsive to electrical energy and includes an electrical energizing control circuit, there being provided on said head switch means in said circuit alternately to close and open the latter with said switch means being operable by said means responding to the presence and absence of a carton top adjacent said head.

18. The carton transport equipment as defined in claim 17 in which said carton stop means at said flap folding station is manipulated by electrical means including an energizing circuit, and said switch means includes circuit making and breaking means in the latter energizing circuit to alter its condition upon movement of said head to an open carton top at said station for effecting thereupon the retraction of said stop means.

19. The carton transport equipment as defined in claim 17 in which said entrance gate means has connected thereto means momentarily to retract it to permit entrance of an open top carton during periods said conveyor section is undriven and electrical means to operate said retracting means including an electrical energizing circuit, an entrance gate control switch is located in said gate retracting circuit which in one position effects the momentary gate retraction and in a second position causes said gate to bar entrance of a succeeding carton, and electrical entrance gate control means is provided to operate said entrance gate control switch including an energizing circuit having therein said head switch means whereby the latter continues the second position of said entrance gate control switch while said relatively high power action of said conveyor section prevails.

20. The carton transport equipment as defined in claim 19 in which is provided a second electrical energizing circuit connected to said electrical means that operates said entrance gate control switch with this second circuit including electrical limit switch means operable by travel of said conveyor section and a switch operable by said carton sensing means at said entrance end whereby said circuits alternately maintain the carton barring position of said entrance gate means at times other than when said conveyor section is undriven.

*21. In an automatic carton closing machine for performing carton closing operations upon each of a series of successive cartons while pausing at a station located at a point along a path of carton advance through the machine past said station; said machine including conveyor means to effect such carton advance and permit such pausing, means to cause each carton to pause at said station, a pair of opposed longitudinally-extending carton clamping and guiding members which are separated transversely and flank opposite sides of said path at said station with at least one thereof being advancable and retractable transversely relative to the other, and means to drive at least one of said clamping and guiding members transversely for advance thereof toward the other and for relative retraction thereof; the improvement that*

*said drive means for at least one of said clamping and guiding members comprises a double-ended pneumatic motor including a cylinder and piston means reciprocatively mounted in said cylinder, means connecting at least one of said clamping and guiding members to said piston means to cause it to advance toward the other member upon thrust of said piston means in said cylinder in one direction and to retract said member relative to the other upon thrust of said piston means in the opposite direction, a pair of fluid-conducting passages respectively connected to opposite ends of said cylinder on opposite sides of said piston means, sources of relatively low pressure and relatively high pressure gaseous medium, and plural-position valve means provided with multiple passages, connected between said gaseous medium sources and said cylinder passages which in one position supplies the relatively high pressure gaseous medium through a first one of said cylinder passages behind said piston means to thrust it forward in member advancing direction to cause said clamping and guiding members to engage opposite sides of a carton pausing at said station for applying clamping force thereto, in a second position substitutes the relatively low pressure gaseous medium for the relatively high pressure gaseous medium behind said piston means elastically to bias at relatively low pressure said advancable and retractable member to its advanced position for reduction of the pressure of said members against opposite sides of a carton therebetween at said station so as to convert said members to guides for this carton and permit its advance therebetween by said conveyor means beyond said station, and in a third position supplies the relatively high pressure gaseous medium through the second cylinder passage ahead of said piston means to thrust it back in member retracting direction to increase separation of said clamping and guiding members for the reception of the next carton therebetween.*

*22. The carton closing machine equipment as defined in claim 21 in which said valve means in the third position maintains connection between the source of the relatively low pressure gaseous medium and said first cylinder passage for application of this pressure behind said piston means while connection between the source of the relatively high pressure gaseous medium and said second cylinder passage is maintained with application ahead of said piston means of the differential of these pressures as the medium of applying the member-retracting back thrust.*

*23. The carton closing machine equipment as defined in claim 21 in which said means to cause each carton to pause at said station comprises movable gate means mounted at the exit end of said station and in an initial position located in the path of forward carton travel to intercept a carton traveling along this path to said station, said gate means being withdrawable from said path to permit carton transport by said conveyor means beyond said station, and a second pneumatic motor having piston means retractable by pressurized gaseous medium supplied to a first end of said cylinder, means connecting said piston means of said second pneumatic motor to said gate*

*means to effect withdrawal of the latter from said path upon retraction of said piston means, conduit means connecting said first end of said cylinder of said second pneumatic motor to said valve means for conduction of the relatively high pressure gaseous medium through the latter in its second position to behind said piston means of this second pneumatic motor so as to retract said piston means and said gate means therewith, and means to return said withdrawn gate means to its carton interception initial position as said clamping members are retracted relative to each other for reception therebetween of a succeeding carton.*

References Cited

The following references, cited by the Examiner, are of record in the patented file of this patent or the original patent.

UNITED STATES PATENTS

| | | | |
|---|---|---|---|
| 3,085,376 | 4/1963 | Ferguson et al. | 53—75 |
| 3,183,639 | 5/1965 | Rodman | 53—75 |

TRAVIS S. McGEHEE, Primary Examiner

U.S. Cl. X.R.

198—29

PO-1050
(5/69)

UNITED STATES PATENT OFFICE
CERTIFICATE OF CORRECTION

Patent No. Reissue 26,650 Dated August 26, 1969

Inventor(s) Winton Loveland and Saul Warshaw

It is certified that error appears in the above-identified patent and that said Letters Patent are hereby corrected as shown below:

Column 1, line 25, for "chaine" read --chine--; column 1, line 38, for "its" read --it--; column 4, line 29, for "reduce" read --reduced--; column 5, line 58, for "metals," read --metals.--; column 7, line 20, for "which (" read --which,--; column 10, line 22, for "traved" read --travel--; column 10, line 51, for "ledge (FIG. 3)" read --ledge 11 (FIG. 3)--; column 14, line 5, for "5" read --5,--; column 21, line 62, for "failing" read --falling--; column 23, line 14, for "chains" read --chain--; column 26, line 69, for "agained" read --again--; column 28, line 2, for "flat" read --flap--; column 28, line 57, for "62-2" read --66-2--; column 30, line 7, for "value" read --valve--; column 32, line 17, for "carbon" read --carton--; column 32, line 57, for "photocellswitch" read --photocell switch--; column 33, line 25, for "catron-receptive" read --carton-receptive--; column 33, line 74, for "32" read --332--; column 34, lines 10 to 17, read as lines 1 to 8 and lines 1 to 8 read as lines 10 to 17; column 34, line 62, for "it" read --is--; column 36, line 26, for "264-2" read as --262-4--; column 37, line 14, for "ready" read --relay--; column 40, line 14, for "lowererd" read --lowered--; column 40, line 74, for "the" (second occurrence) read --this--; column 41, line 51, for "side" read --site--; column 44, line 35, for "(d)" read --(D)--; column 44, line 38, for "pasuing" read --pausing--.

SIGNED AND
SEALED
APR 28 1970

(SEAL)
Attest:

Edward M. Fletcher, Jr.
Attesting Officer

WILLIAM E. SCHUYLER, JR.
Commissioner of Patents